United States Patent [19]

Namba et al.

[11] Patent Number: 5,741,623
[45] Date of Patent: Apr. 21, 1998

[54] OPTICAL RECORDING MEDIUM

[75] Inventors: Kenryo Namba; Akihiko Kuroiwa; Shiro Nakagawa, all of Tokyo, Japan

[73] Assignee: TDK Corporation, Japan

[21] Appl. No.: 990,979

[22] Filed: Dec. 9, 1992

Related U.S. Application Data

[63] Continuation of Ser. No. 918,924, Jul. 22, 1992, abandoned, which is a continuation of Ser. No. 143,312, Jan. 6, 1988, abandoned, which is a continuation of Ser. No. 895,860, Aug. 12, 1986, abandoned, which is a continuation-in-part of Ser. No. 518,359, Jul. 29, 1983, abandoned.

[30] Foreign Application Priority Data

| Jul. 30, 1982 | [JP] | Japan | 57-134397 |
| Jul. 31, 1982 | [JP] | Japan | 57-134170 |
| Sep. 25, 1982 | [JP] | Japan | 57-166832 |
| Sep. 27, 1982 | [JP] | Japan | 57-168048 |
| Oct. 11, 1982 | [JP] | Japan | 57-177776 |
| Oct. 18, 1982 | [JP] | Japan | 57-182589 |
| Nov. 1, 1982 | [JP] | Japan | 57-192879 |
| Nov. 2, 1982 | [JP] | Japan | 57-193685 |
| Dec. 28, 1982 | [JP] | Japan | 57-234245 |
| Dec. 29, 1982 | [JP] | Japan | 57-233157 |
| Dec. 30, 1982 | [JP] | Japan | 57-232241 |
| Dec. 31, 1982 | [JP] | Japan | 57-232198 |
| Dec. 31, 1982 | [JP] | Japan | 57-232199 |

[51] Int. Cl.$^6$ .............................. G03C 1/72; G11B 7/24
[52] U.S. Cl. .................. 430/270.19; 430/270.2; 430/270.21; 430/945; 428/64.8; 428/64.4; 369/288; 369/284
[58] Field of Search ............. 430/270, 495, 430/945, 964, 270.21, 270.19, 270.2; 346/135.1; 369/284, 286, 288

[56] References Cited

U.S. PATENT DOCUMENTS

| 4,412,231 | 10/1983 | Namba et al. | 430/964 |
| 4,713,314 | 12/1987 | Namba et al. | 430/495 |
| 4,735,889 | 4/1988 | Namba et al. | 430/495 |
| 5,219,707 | 6/1993 | Namba | 430/495 |
| 5,512,416 | 4/1996 | Namba et al. | 430/270.21 |

*Primary Examiner*—Martin Angebranndt
*Attorney, Agent, or Firm*—Henry T. Burke

[57] ABSTRACT

An optical recording medium has deposited on a substrate a recording layer incorporating therein a cyanine dye, preferably an indoline dye, and optionally incorporating therein an autoxidizable compound or a thermoplastic resin and/or a singlet oxygen quencher.

7 Claims, No Drawings

OPTICAL RECORDING MEDIUM

RELATED APPLICATION

This application is a continuation application of application Ser. No. 07/918,924 filed Jul. 22, 1992 and now abandoned which is a continuation of application Ser. No. 07/143,312 filed Jan. 6, 1988 and now abandoned which is a continuation of application Ser. No. 06/895,860 filed Aug. 12, 1986 and now abandoned which is a continuation in part of application Ser. No. 06/518,359 filed Jul. 29, 1983 and now abandoned.

BACKGROUND OF THE INVENTION

1. Field of the Invention

This invention relates to an optical recording medium, and more particularly to an optical recording medium of the heat mode.

2. Description of Prior Art

The optical recording medium by nature requires no direct contact between the medium itself and the writing/reading head and, therefore, features perfect freedom of the recording medium from degradation by abrasion. This salient feature has encouraged a large amount of research and development activities on a wide variety of optical recording media.

Among other optical recording media, the optical recording media of the heat mode are attracting considerable attention from those engaged in research and development activities owing to advantages such as, for example, obviating the necessity for developing recorded images in a dark room.

The optical recording media of this heat mode are designed to operate by making use of the recording beam as the source of heat. For example, the recording beam such as the laser beam is utilized to melt, remove, or otherwise incise part of the medium so as to write data in the medium in the form of small holes called "pits". By thus inserting pits in prescribed patterns in the medium, information is recorded as desired. The information thus recorded in the medium is read out by causing the reading beam to sense the patterns in which pits are arranged.

To cite examples of the optical recording media involving formation of such pits, the type which has a recording layer of a light-absorbing dye superposed on a substrate so that pits are formed by causing the dye to be melted by the recording light, the type which has a recording layer incorporating an autoxidizable compound such as nitrocellulose and a light-absorbing dye superposed on a substrate so that pits are formed by causing nitrocellulose and other materials to be decomposed by the recording light, and the type which has a recording layer of a thermoplastic resin and a light-absorbing dye deposited by spreading on a substrate so that pits are formed by melting the resin and dye are known.

Incidentally, it has been observed that with a dye such as, for example, the cyanine dye which is used with a light of long wavelength, particularly a laser diode beam, there occur detrimental phenomena such as the degradation of the dye due to the oxidation caused by the red to near infrared light present in ambient light and degradation of the S/N ratio 9 or C/N ratio of the read signal retrieved from the written information (degraded reading signal) owing to repeated exposure of the dye to the reading light.

One plausible explanation of these phenomena is based on a theory that when dye is excited by the red to near infrared light of long wavelength, energy transfer and consequent formation of singlet oxygen ensue and this singlet oxygen degrades the dye by oxidation. The inventors have found that occurrence of these phenomena is abated by incorporating a quencher in addition to the dye in the recording layer. They have already disclosed this information to the art.

In this case, the quencher assumes an excited state by relieving the singlet oxygen or the dye of the burden of electron transfer or energy transfer and consequently enables itself to resume its normal state. When the dye excites itself by absorbing the reading beam and induces formation of singlet oxygen, the quencher converts the singlet oxygen into its triplet state or impedes the formation of singlet oxygen, with the result that the aforementioned degradation of reading signal is notably abated.

With the dye of the type described above, although the degradation due to the oxidation caused by red to near infrared color occurs preponderantly, degradation caused by the ultraviolet to visible light also occurs.

Even when the recording layer contains a quencher, the disadvantage that the sensitivity of the recording layer to the writing beam the C/N or S/N ratio of the read signal are degraded after prolonged standing of the recording layer under the room light still persists.

One well-known optical recording medium of the type involving the formation of pits has a recording layer of tellurium or a tellurium-selenium-arsenic mixture, for example, deposited by the vapor-phase coating technique on a substrate so that formation of pits is accomplished by causing tellurium or a tellurium mixture to be melted.

In a recording medium of this operating principle, a groove for tracking is formed on the substrate, the recording layer is deposited in a substantially uniform thickness to cover the groove and the uncut surface of the substrate separated by the groove, the portion of the recording layer which overlies the uncut surface separated by the groove, for example, is used as a recording track for formation of pits thereon, and the writing of information is effected on the recording track from the surface side of the recording layer, for example.

In this case, the thickness of the recording layer is limited to within the range of about 0.01 to 2 um so as to maximize the sensitivity of recording and the C/N ratio of the reading signal.

The groove is formed to detect the beam under polarizing the direction of reflected ray to one direction by interference effect of phase difference based on depth of the groove, when the beam spots for writing/reading starts to come off from the recording track, so it is usually about /8n (is wavelength of the beam light). n is the reflective index of a substrate.

To cite other optical recording media involving formation of pits, the type which has a recording layer of a light-absorbing dye applied by spreading on a substrate so that formation of pits is effected by causing the due to be melted by the recording beam, the type which has a recording layer of an autoxidizable compound such as nitrocellulose and a light-absorbing dye deposited by spreading on a substrate so that the formation of pits is obtained by causing nitrocellulose and other component to be decomposed, and the type which has a recording layer of a thermoplastic resin and a light-absorbing dye deposited by spreading on a substrate so that the formation of pits is attained by causing the resin and the dye to be melted have become popular [Appl. Phys. Lett. 39, (9) 718–720(1981); Appl. Phys. A26, 101–105(1981); J. Vac. Sci. Technol. 18(1)92–99 & 105–109 (1981)]

These media which have such various recording layers deposited by spreading on their respective substrates are easy to manufacture because they do not require the vacuum deposition technique.

When a recording layer is superposed on a substrate which has a tracking groove as described above, however, since the recording layer, because of the behavior of any applied fluid coat, is necessarily produced in the form of flat surface film without reference to the presence of absence of the groove, the thickness and the reflectance of the recording layer are different on the depressed surface of the groove and on the surface above the groove. As a natural consequence, the deviation of the reflected beam owing to the interference caused by the phase difference is small. The optimum thickness of the recording layer which maximizes the writing sensitivity and the C/N ratio, the optimum dimensions of the groove which permits still better control of tracking, and the optimum magnitudes of other physical attributes remain yet to be found.

U.S. Pat. No. 4,465,767 to Oba and Ubehara describes an optical recording medium including a reflective layer containing metal particles. The products of this invention as will be clear hereinafter do not require a reflective layer.

U.S. Pat. No. 4,320,489 describes certain structures useful as optical storage media. These structures all contain an electroconductive layer. It is a feature of the optical recording media of this invention that they do not utilize electroconductive systems.

U.S. Pat. No. 4,412,231 which is assigned to the assignee of this invention and includes as coinventors some of the same coinventors of this invention describes optical recording media containing a plurality of dyes some of which are reflective dyes some of which are not. By so doing the invention of the patent results in a widening of the light absorbable wavelength so that various wavelengths of light such as argon laser, helium-neon laser, etc. can be employed. The products however require relatively thick recording layers so that there is reduced sensitivity compared to the products of this invention.

SUMMARY OF THE INVENTION

An object of this invention, therefore, is to provide a novel optical recording medium.

Another object of this invention is to provide an optical recording medium which comprises a substrate made of resin and a recording layer formed of a dye or a dye composition as deposited on the substrate and which has an excellent S/N ratio of read signal.

Yet another object of this invention is to provide an optical recording medium which is minimally affected by degradation of reading signal and degradation of preservability under the ambient light.

The objects described above are accomplished by this invention providing an optical recording medium having deposited on a substrate a recording layer containing a light-absorbing dye represented by the general formula I:

$$\phi^+-L=\psi(X^-)_m \quad (I)$$

wherein $\phi^+$ and $\psi$ each denote an indole ring residue or a benzindole ring residue, L denotes a combining group for forming a mono-, di-, tri- or tetra-carbocyanaine, $X^-$ denotes an anion, and m denotes 0 or 1. In addition to the dye represented by the general formula I, the recording layer may contain an autoxidizable compound or a thermoplastic resin. The recording layer may contain therein a quencher for singlet oxygen in addition to the dye represented by the general formula I. Further, the recording layer may contain an autoxidizable compound or a thermoplastic resin and a quencher for singlet oxygen in addition to the dye represented by the formula I.

The objects described above are further attained by this invention providing an optical recording medium which has deposited on a substrate a recording layer containing a dye and at least one quencher. This recording layer may contain an autoxidizable compound or a thermoplastic resin in addition to the dye. Further this recording layer may contain an ultraviolet light-absorbing agent in addition to the dye and the quencher. This recording layer may contain a visible light-absorbing agent in addition to the dye the quencher, and the ultraviolet light-absorbing agent. The aforementioned dye, to suit the optical recording medium contemplated by this invention, is desired to be a cyanine dye, and preferably a cyanine dye represented by the general formula II:

$$\phi'-L=\psi'(X^-)_m \quad (II)$$

wherein $\phi'$ and $\psi'$ each denote the residue of a thiazole ring, a selenazole ring, an imidazole ring, or a pyridine ring which may form a polycondensate with a benzene ring or a naphthalene ring, L denotes a combining group for formation of a mono-, di-, tri- or tetra-carbocyanine, $X^-$ denotes an anion, and m denotes 0 or 1.

The various objects described above are also attained by this invention providing an optical recording medium which has deposited on a substrate a recording layer containing a light-absorbing dye represented by the general formula III:

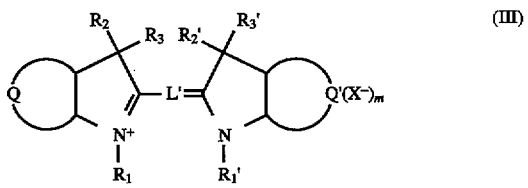

wherein Q and Q' each denote a polycondensed aromatic ring, $R_1$ and $R_1'$ each denote a substituted or unsubstituted alkyl group having not more than four carbon atoms, $R_2$, $R_2'$, $R_3$ and $R_3'$ each denote an alkyl group or an aryl group, L'denotes a combining group for formation of a cyanine, $X^-$ denotes an anion, and m denotes 0 or 1. This recording layer may contain a resin in addition to light absorbing dye. This recording layer may contain a quencher for singlet oxygen in addition to the light-absorbing dye. Further, this recording layer may contain a resin and a quencher for singlet oxygen in addition to the light-absorbing dye.

The various objects described above are further accomplished by this invention providing an optical recording medium which has deposited on a substrate a recording layer formed of a light-absorbing dye represented by the general formula IV:

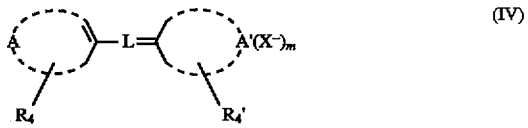

wherein A and A' each denote a thiazole ring, an oxazole ring, a selenazole ring, an imidazole ring or a pyridine ring which may have a polycondensate with an aromatic ring, $R_4$ and $R_4'$ each denote a substituted or unsubstituted alkyl group having up to four carbon atoms, L denotes a combining group for formation of a mono-, di-, tri- or tetra-carbocyanine, X⁻ denotes an anion, and m denotes 0 or 1. This recording layer may contain a resin or a quencher for singlet oxygen or both in addition to the dye.

The various objects described above are further accomplished by this invention providing an optical recording medium which has deposited on a substrate a recording layer formed of a light-absorbing dye represented by the general formula IIa:

(IIa)

wherein φ" and ψ" each denote a thiazole ring, an oxazole ring, a selenazole ring, an imidazole ring or a pyridine ring which may have a polycondensate with an aromatic ring, but nitrogen atom in the φ" and ψ" does not bind a substituted or non-substituted alkyl group having 4 and more carbon atoms; L denotes a combining group for formation of a mono-, di, tri or tetra-carbocyanine, X⁻ denotes an amino, and m denotes 0 or 1. But the recording layer does not contain a singlet oxygen quencher.

The various objects described above are also fulfilled by this invention providing an optical recording medium which has deposited on a substrate made of resin a recording layer having a dye or a dye composition superposed on an underlying layer formed of titanium dioxide or a hydrolyzate of a Zr or Al chelate compound.

PREFERRED EMBODIMENTS OF THE INVENTION

This invention first relates to an optical recording medium which has deposited on a substrate a recording layer containing therein a light-absorbing dye represented by the general formula I:

(I)

wherein φ⁺ and ψ each denote an indole ring residue or a bezindole ring residue, L denotes a combining group for forming a mono-, di-, tri- or tetra-carbocyanine, X⁻ denotes an anion, and m denotes 0 or 1.

In the aforementioned general formula I, φ and ψ which represent residues of an indole ring or a benzindole ring are so related to each other that φ has a + electron charge in the N atom of the indole ring and ψ has a neutral N atom.

They may be like or unlike, and may each have a varying substituent bonded thereto.

Among other various possible combinations of φ and ψ, the combination in which they are like each other is particularly desirable especially, when each of the residues is represented by the following formulas V to VIII.

In these formulas, the electric charge symbol (•)attached to the 2-position of the indole group denotes

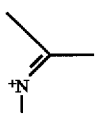

for φ and

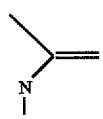

for ψ respectively.

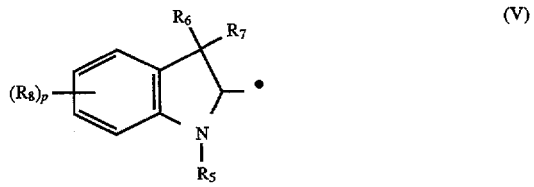
(V)

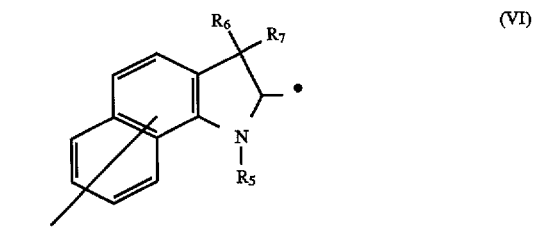
(VI)

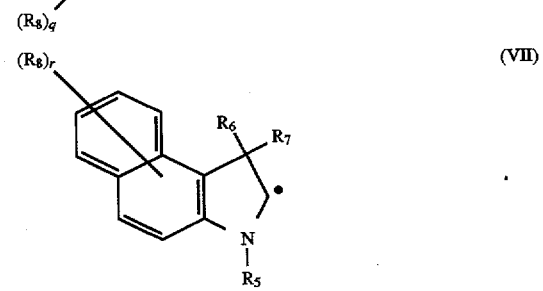
(VII)

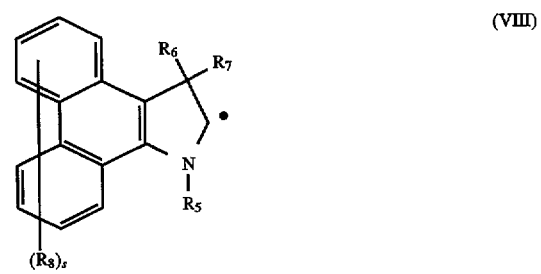
(VIII)

In the formulas V through VIII, $R_5$ denotes a substituted or unsubstituted alkyl group. The number of carbon atoms in this alkyl group is from 1 to 5. Examples of the substitutents desirable for incorporation in this alkyl group include sulfonic acid group and alkylcarboxyoxy groups. Other substituents usable for this purpose are alkylamide groups, alkyloxy groups, carboxylic acid groups and hydroxyl group.

In this case, $R_5$ in φ has a minus (−) electron charge when m is 0.

$R_6$ and $R_7$ each denote an alkyl group or aryl group such as a phenyl group, preferably an alkyl group. In this case, the alkyl group is not further substituted and is desired to have one or two carbon atom, preferably one carbon atom.

$R_8$ denotes a substituent which may be alkyl group, aryl group, heterocyclic residue, hydrogen atom, halogen atom, alkoxy group, alkylthio group, alkylhydroxycarbonyl group or carboxylic acid group.

Then, p, q, r and s generally denote 0 or an integer of the value of 1 to 4. Where p, q, r and s are or more, the plurality of $R_8$'s may be dissimilar.

If there is no particular need for $R_8$' p may be 0.

L denotes a combining group for the formation of a mono-, di-, tri- or tetra-carbocyanine. Preferably, this combining group is desired to be any of the groups represented by the following formulas X through XXI.

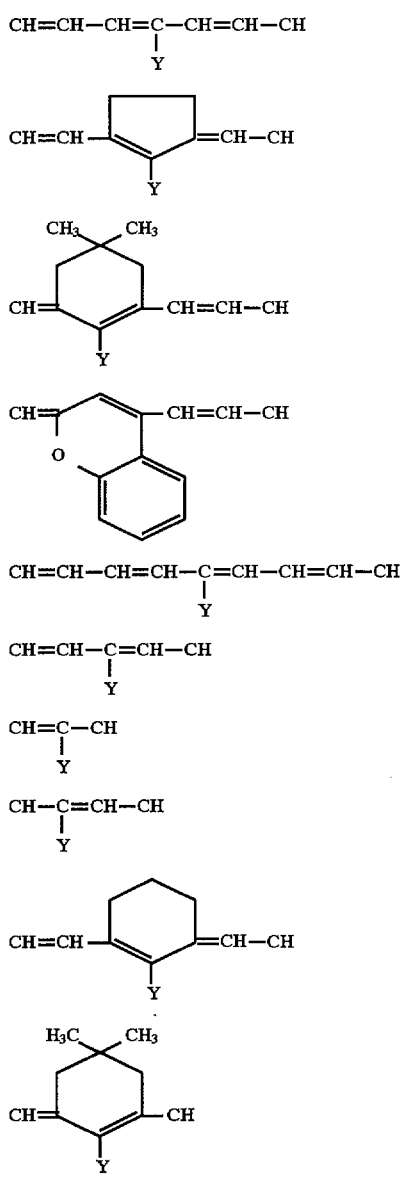

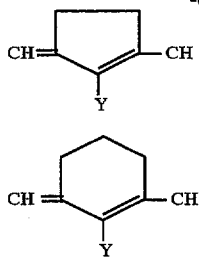

(X)

(XI)

(XII)

(XIII)

(XIV)

(XV)

(XVI)

(XVII)

(XVIII)

(XIX)

(XX)

(XXI)

In the formulas given above, Y denotes hydrogen atom or a monovalent group. Examples of the monovalent groups which prove advantageous herein include lower alkyl groups such as the methyl group, lower alkoxy groups such as methoxy group, cycloalkyl groups, di-substituted amino groups such as the dimethyl amino diphenyl amino or methylphenyl amino group, the morpholino group, the imidazolidine group, the ethoxycarbonyl piperazine group, alkylcarbonyloxy groups such as the acetoxy group, alkylthio groups such as methoxy group, halogen atoms such as Br and Cl, the cyano group and the nitro group.

In the aforementioned formulas X through XXI, the formulas X through XIV, preferably the formulas X and XI, which represent tri- and tetra-carbocyanines prove especially advantageous.

When $X^-$ denotes an anion, examples of the anion which proves desirable herein include, $I^-$, $Br^-$, $ClO_4^-$, $BF_4^-$,

In the formulas, m is 0 or 1. When m is 0, $R_5$ of $\phi$ possesses a minus (−) electron charge and constitutes an intramolecular salt.

Table 1 given in the following pages shows typical representative concrete examples of the light-absorbing dye of the present invention.

TABLE 1

| Dye No. | Φ | ψ | $R_5$ | $R_6$ | $R_7$ | $R_8$ | L | Y | X |
|---|---|---|---|---|---|---|---|---|---|
| $D_1$ | [V] | [V] | —$CH_3$ | —$CH_3$ | —$CH_3$ | | [X] | H | I |
| $D_2$ | [V] | [V] | —$CH_3$ | —$CH_3$ | —$CH_3$ | | [X] | H | $ClO_4$ |
| $D_3$ | [V] | [V] | —$C_2H_5$ | —$CH_3$ | —$CH_3$ | | [XI] | —N($C_6H_5$)($C_6H_5$) | $ClO_4$ |
| $D_4$ | [V] | [V] | —$(CH_2)_3SO_3$—<br>—$(CH_2)_3SO_3^-Na^+$ | —$CH_3$ | —$CH_3$ | | [X] | H | — |
| $D_5$ | [VI] | [VI] | —$CH_3$ | —$CH_3$ | —$CH_3$ | | [X] | H | $ClO_4$ |
| $D_6$ | [VII] | [VII] | { —$(CH_2)_3SO_3^-$<br>—$(CH_2)_3SO_3^-Na^+$ | —$CH_3$ | —$CH_3$ | | [X] | H | — |

TABLE 1-continued

| Dye No. | Φ | ψ | R₅ | R₆ | R₇ | R₈ | L | Y | X |
|---|---|---|---|---|---|---|---|---|---|
| D₇ | [VII] | [VII] | −(CH₂)₃SO₃⁻<br>−(CH₂)₃SO₃⁻ | −CH₃ | −CH₃ | | [XI] | −N⟨ ⟩N−COOC₂H₅ | − |
| D₈ | [VII] | [VII] | −NH⁺(C₂H₅)₃<br>−C₂H₅ | −CH₃ | −CH₃ | | [X] | H | BF₄ |
| D₉ | [VII] | [VII] | −(CH₂)₃OCOCH₃ | −CH₃ | −CH₃ | | [XI] | −N(C₆H₅)(C₆H₅) | ClO₄ |
| D₁₀ | [VII] | [VII] | −CH₃ | −CH₃ | −CH₃ | | [X] | H | ClO₄ |
| D₁₁ | [VII] | [VII] | −CH₃ | −CH₃ | −CH₃ | | [X] | H | I |
| D₁₂ | [V] | [V] | −CH₃ | −CH₃ | −CH₃ | −H | [XIII] | H | I |
| D₁₃ | [VII] | [VII] | −CH₃ | −CH₃ | −CH₃ | −H | [X] | H | I |
| D₁₄ | [VIII] | [VIII] | −CH₃ | −CH₃ | −CH₃ | −H | [X] | H | I |
| D₁₅ | [V] | [V] | −CH₃ | −CH₃ | −CH₃ | −H | [XVI] | H | I |

These cyanine dyes are listed in Organic Chemicals List (1969) and Organic Chemicals List (Supplement) (1974) by Nippon Kanko-Shikiso Kenkyusho, Eastman Laser Products (1979) by Eastman Kodak Co., the Glossary of Organic Compounds for Dye Laser (4), Laser Research 3, and "Nitrogen-containing Heterocyclic Compounds I" of the Great Organic Chemistry page 432 etc. (Asakura Shoten), and they can be synthesized by methods known to the art.

Any of these dyes used alone may constitute a recording layer. Otherwise, it may be incorporated in a recording layer in combination with (a) an autoxidizable compound or a thermoplastic resin, (b) a quencher for singlet oxygen or (c) an autoxidizable compound or a thermoplastic resin (a) and a quencher for singlet oxygen (b). In the case of the combined use of (b), since the crystallization of the dye within the layer is curbed and the physical properties of the produced layer are improved as compared with the recording layer formed solely of the dye.

The autoxidizable compound to be incorporated in the recording layer undergoes oxidative decomposition when it is heated to an elevated temperature.

As examples of the autoxidizable compound which behave as described above, those compounds disclosed in Japan Unexamined Patent Application Disclosure (Tokkai) No. 24,290/1982 may be cited. Among other compounds so disclosed, nitrocellulose proves particularly advantageous.

The thermoplastic resin which is incorporated in the recording layer in place of the autoxidizable compound or occasionally in combination with the autoxidizable compound fulfills the requirement that it should soften when the light-absorbing component present in the layer is heated to an elevated temperature by absorbing the recording beam. Any of the various thermoplastic resins which meet this requirement may be used.

Of the numerous thermoplastic resins available herein, those which prove particularly advantageous in this invention are as follows.

i) Polyolefins

Concrete examples are polyethylene, polypropylene and poly (4-methylpentene-1).

ii) Polyolefin copolymers

Concrete examples are ethylene-vinyl acetate copolymers, ethylene-acrylate copolymers, ethylene-acrylic acid copolymers, ethylene-propylene copolymer, ethylene-butene-1 copolymer, ethylene-maleic anhydride copolymer and ethylene-propylene-propylene terpolymers (EPT).

In this case, the polymerizing ratios of comonomers may be freely selected.

iii) Vinyl chloride copolymers

Concrete examples are vinyl acetate-vinyl chloride copolymers, vinyl chloride-vinylidene chloride copolymers, vinyl chloride-maleic anhydride copolymers, copolymer of acrylic ester with methacrylic ester or of methacrylic ester with vinyl chloride, acrylonitrile-vinyl chloride copolymers, vinyl chloride-vinyl ether copolymers, ethylene- or propylene-vinyl chloride copolymers and copolymers having vinyl chloride graft polymerized to ethylene-vinyl acetate copolymers.

In this case, the polymerizing ratios of comonomers may be freely selected.

iv) Vinylidene chloride copolymers.

Concrete examples are vinylidene chloride-vinyl chloride copolymers vinylidene chloride-vinyl chloride-acrylonitrile copolymers and vinylidene chloride-butadiene-halogenated vinyl copolymers.

In this case, the copolymerizing ratio of comonomers may be freely selected.

v) Polystyrene vi) Styrene copolymers

Concrete examples are styrene-acrylonitrile copolymers (AS resin), styrene-acrylonitrile-butadiene copolymers (ABS resin), styrene-maleic anhydride copolymer (SMA resin), styrene-acrylic ester-acrylamide copolymers, styrene-butadiene copolymers (SBR), styrene-vinylidene chloride copolymers and styrene-methyl methacrylate copolymer.

In this case, the copolymerizing ratios of comonomers may be freely selected.

vii) Styrene type polymers

Concrete examples are homopolymers of p-methyl styrene, 2,5-dichlorostyrene, α,β-vinyl naphthalene, α-vinyl pyridine, acenaphthalene and vinyl anthracene and copolymers thereof.

viii) Cumarone-indene resin

Concrete examples include copolymers of cumarone-indene-styrene.

ix) Terpene resins or picolite

Concrete examples are terpene resin obtained as polymers of limonene from α-pinene and picolite obtained from β-pinene.

x) Acrylic resins

Acrylic resins containing repeating units represented by the following formula prove particularly advantageous.

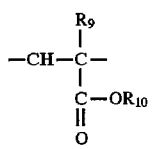

In the formula given above, $R_9$ denotes a hydrogen atom or an alkyl group and $R_{10}$ denotes a substituted or unsubstituted alkyl group. In the aforementioned formula, $R_9$ is desired to be a hydrogen atom or a lower alkyl group having one to four carbon atom, preferably a hydrogen atom or a methyl group. $R_{10}$ may be a substituted or unsubstituted alkyl group; the alkyl group is desired to have one to four carbon atoms. When $R_{10}$ is a substituted alkyl group, the substituent involved in the substitution of the alkyl group is desired to be a hydroxyl group, a halogen atom or an amino group (particularly a dialkyl-amino group).

The atomic group represented by the aforementioned formula combines with the other repeating atomic groups of its kind to form copolymers and give rise to varying acrylic resins. Generally, one or more of the atomic groups represented by the aforementioned formula are repeated to form homopolymers or copolymers and give rise to acrylic resins.

Xi) Polyacrylonitrile

Xii) Acrylonitrile copolymers

Concrete examples are acrylonitrile-vinyl acetate copolymers, acrylonitrile-vinyl chloride copolymers, acrylonitrile-styrene copolymers, acrylonitrile-vinylidene chloride copolymers, acrylonitrile-vinyl pyridine copolymers, acrylonitrile-methyl methacrylate copolymers, acrylonitrile-butadiene copolymers and acrylonitrile-butyl acrylate copolymers.

In this case, the copolymerizing ratios of comonomers may be freely selected.

xiii) Diacetone-acrylamide polymers

Concrete examples are diacetone-acrylamide polymers obtained by the action of acetone upon acrylonitrile.

xiv) Poly (vinyl acetate)

xv) Vinyl acetate copolymers

Concrete examples are copolymers of vinyl acetate with acrylic esters, vinyl ethers, ethylene and vinyl chloride.

In this case, the copolymerizing ratios of comonomers may be freely selected.

xvi) Polyvinyl ethers

Concrete examples are polyvinyl methyl ether, polyvinyl ethyl ether and polyvinyl butyl ether.

xvii) Polyamides

Concrete examples are ordinary homonylons such as nylon 6, nylon 66, nylon 610, nylon 612, nylon 9, nylon 11, nylon 12 and nylon 13 and copolymers such as nylon 6/6,6/6,10, nylon 6/6,6/12 and nylon 6/6,6/11. Optionally, modified nylons are usable.

xviii) Polyesters

Concrete examples are polycondensates and copolycondensates of various dibasic acids including aliphatic dibasic acids such as oxalic acid, succinic acid, maleic acid, adipic acid and sebacic acid and aromatic dibasic acids such as isophthalic acid and terephthalic acid with glycols such as ethylene glycol, propylene glycol, tetramethylene glycol and hexamethylene glycol. In these polycondensates and copolycondensates, polycondensates of aliphatic dibasic acids with glycols and copolycondensates of glycols with aliphatic dibasic acids prove particularly desirable.

Modified Glyptal resins obtained by esterifying Glyptal resin, which is a polycondensate of phthalic anhydride with glycerine, by the use of an aliphatic acid or natural resin may be suitably used.

xix) Polyvinyl acetal type resins

Polyvinyl formal and polyvinyl acetal type resins obtained by acetalizing polyvinyl alcohols may be advantageously employed.

In this case, the degree of acetalization of polyvinyl acetal type resin may be freely selected.

xx) Polyurethane resins

Concrete examples are thermoplastic polyurethane resins having a urethane bond. More desirable examples are those polyurethane resins which are obtained by the polycondensation of glycols with diisocyanates. The most desirable examples are those polyurethane resins obtained by the polycondensation of alkylene glycols with alkylene diisocyanates.

xxi) Polyethers

Concrete examples are styrene-formalin resins, open-ring polymers of cyclic acetal, polyethylene oxide and glycol, polypropylene oxide and glycol, propylene oxide-ethylene oxide copolymers and polyphenylene oxide.

xxii) Cellulose derivatives

Concrete examples are organic acid esters and ethers and their mixtures.

xxiii) Polycarbonates

Concrete examples are polydioxydiphenyl methane carbonate, polydioxydiphenyl ethane carbonates and dioxydiphenyl propane carbonate.

xxiv) Blends of two or more members selected from the thermoplastic resins indicated in i) through xxiii) above and blends of such thermoplastic resins with other thermoplastic resins.

The molecular weights and other similar attributes of the autoxidizable compound the thermoplastic resin for use in the recording layer are not critical.

The autoxidizable compound or the thermoplastic resin described above and the aforementioned dye are generally mixed in a weight ratio to be selected suitably in a wide range of 1:0.1–100, preferably 1:5–20 in order that the produced recording layer may acquire a desired transmittance which will be described more fully below.

In combination with or in the place of the aforementioned autoxidizable compound or thermoplastic resin, a quencher for singlet oxygen can be incorporated in the recording layer.

Quenchers for singlet oxygen are quite numerous. Among other quenchers, transient metal chelate compounds constitute particularly advantageous quenchers because they improve the stability and the resistance to light to a great extent, enhance the absorption of writing laser beams of long wavelength, abate degradation of reproduction, and exhibit high compatibility with the dye. In these metal chelate compounds, the central metallic ions are desired to be those of Ni, Co, Cu, Pd, Pt and Mn. Concrete examples of particularly desirable chelate compounds are shown below.

For the sake of this invention, the transient metal chelate compound is desired to have an absorption wavelength, preferably a maximum absorption wavelength, in the range of 680 to 1,500 nm.

1) Acetyl acetonate type

Q1—Ni acetyl acetonate

Q2—Cu acetyl acetonate

Q3—Mn acetyl acetonate

Q4—Co acetyl acetonate

2) Bisdithio-α-diketone type
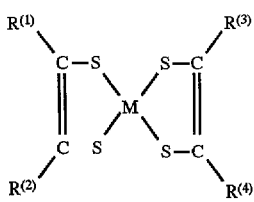
wherein $R^{(1)}$ through $R^{(4)}$ denote independently one member selected from the group consisting of hydrogen, phenyl, substituted phenyl, nitrile and alkyl, and M denotes a transient metal atom (Ni, Co, Cu, Pd, Pt or such).
Q5- Ni dithiobenzyl
Q6- Ni dithioibiacetyl
Q7- 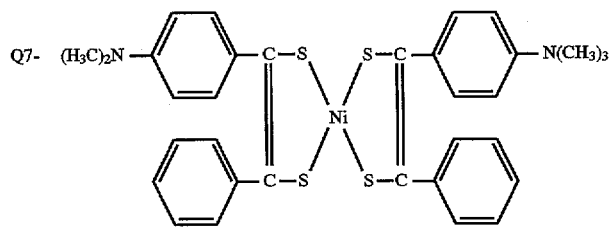
Q8- 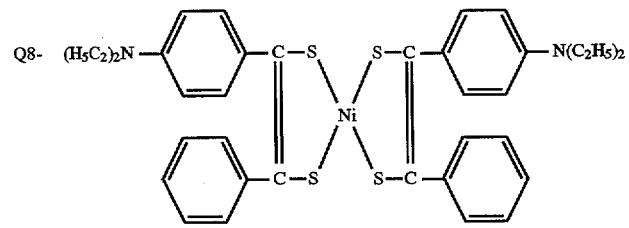
Q9- 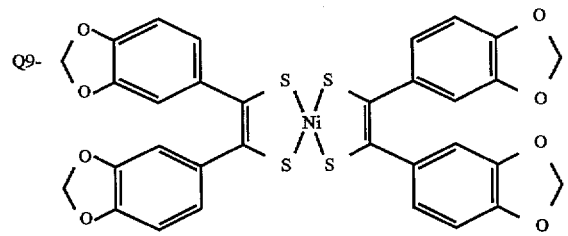
Q10 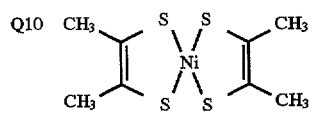
Q11 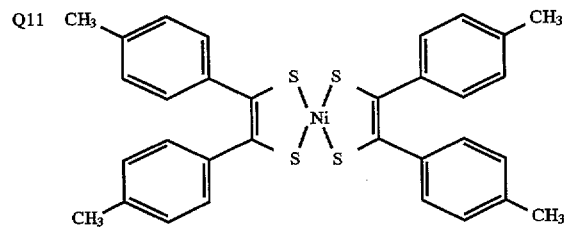

-continued

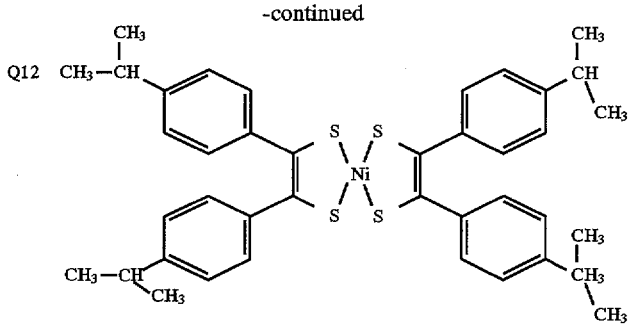

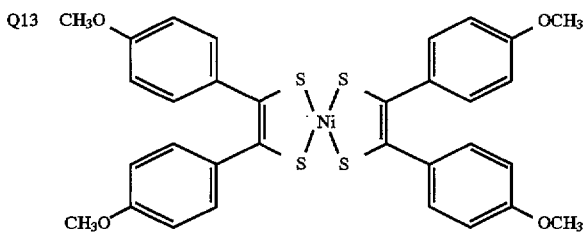

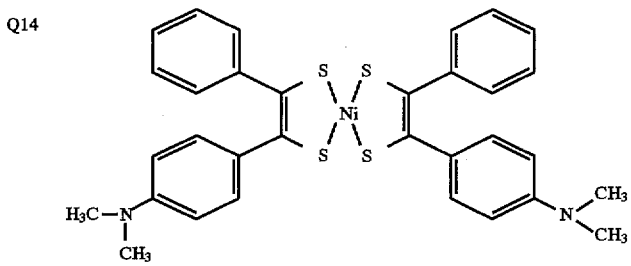

Q9 through Q14 are described in Japanese Unexamined Patent Application Disclosure (Tokkai) 87,649/1980 as a metal chelate quenchers, and the method for preparation of these is described in G. N. Schrauzer, Accounts of Chemical Research, Vol. 2, page 72(1969)

3) Bisphenyl dithiol type

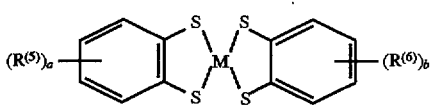

wherein $R^{(5)}$ and $R^{(6)}$ each denote a substituted or unsubstituted alkyl group such as a methyl group or a halogen atom such as Cl and M denotes a transient metal atom (Ni, Co, Cu, Pd, Pt or such).

M possesses a minus (−) electron charge and may form a salt with an cation, as following formula.

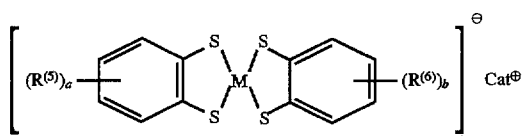

wherein Cat $^\oplus$ denotes a cation.

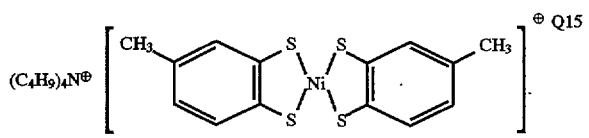

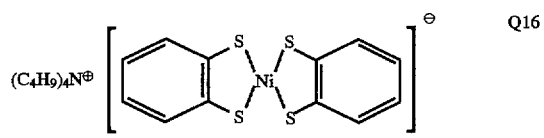

Q15 and Q16 are described in the same Japanese Unexamined Patent Application Disclosure indicated at 2), and the method for preparation of these is described in the same Accounts of Chemical Research indicated at 2).

Bisphenyl dithiol type chelate compounds which are available in the market are as follows.

Q17—IRA PA-1001 (trademark designation; produced by Mitsui-Toatsu Fine Co., Ltd.)
Q18—IRA PA-1002 (same as above)
Q19—IRA PA-1003 (same as above)
Q20—IRA PA-1005 (same as above)
Q21—IRA PA-1006 (same as above)

4) Salicylaldehyde oxime type

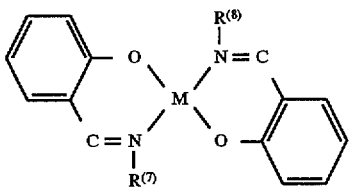

wherein $R^{(7)}$ and $R^{(8)}$ each denote an alkyl group and M denotes a divalent transient metal atom.

Q22—Ni—O—(N-isopropyl formimidoyl)-phenol
Q23—Ni—O—(N-dodecylformimidoyl)-phenol
Q24—Co—O—(N-dodecylformimidoyl)-phenol
Q25—Cu—O—(N-dodecylformimidoyl)-phenol 5) Thiobisphenolate chelate type

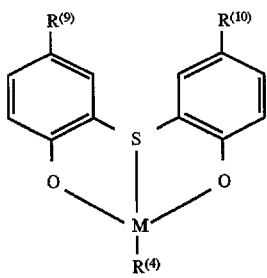

wherein M has the same meaning as above, $R^{(9)}$ and $R^{(10)}$ each denote an alkyl group, and $R^{(4)}$ denotes an amino group.

Q26—Ni-n-butylamino-[2,2'-thiobis (4-tert.-octyl)-phenolate][Cyasorb-UV-1084 (American Cyanamid Co., Ltd.)]

Q27—Co-n-butylamino-[2,2'-thiobis (4-tert.-octyl)-phenolate]

6

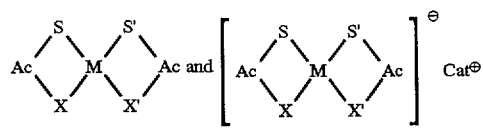

These are described in Japanese Unexamined Patent Application Disclosure (Tokkai) 87,649/1980 as a metal chelate quencher, and wherein M denotes Ni, Co, Cu, Pd or Pt, X and X' denote independently denote sulfur, Ac denotes one structure selected from the group consisting of

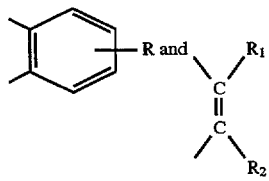

wherein R denotes hydrogen atom or alkyl group, $R_1$ and $R_2$ denote independently one member selected from the group consisting of hydrogen, phenyl, substituted phenyl, nitrile and alkyl, and $Cat^{\oplus}$ denotes a cation.

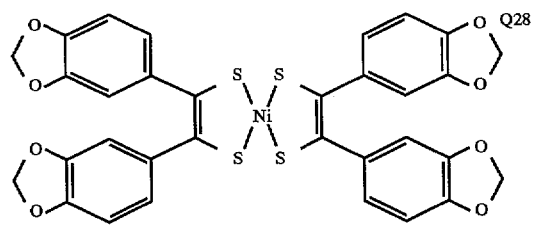

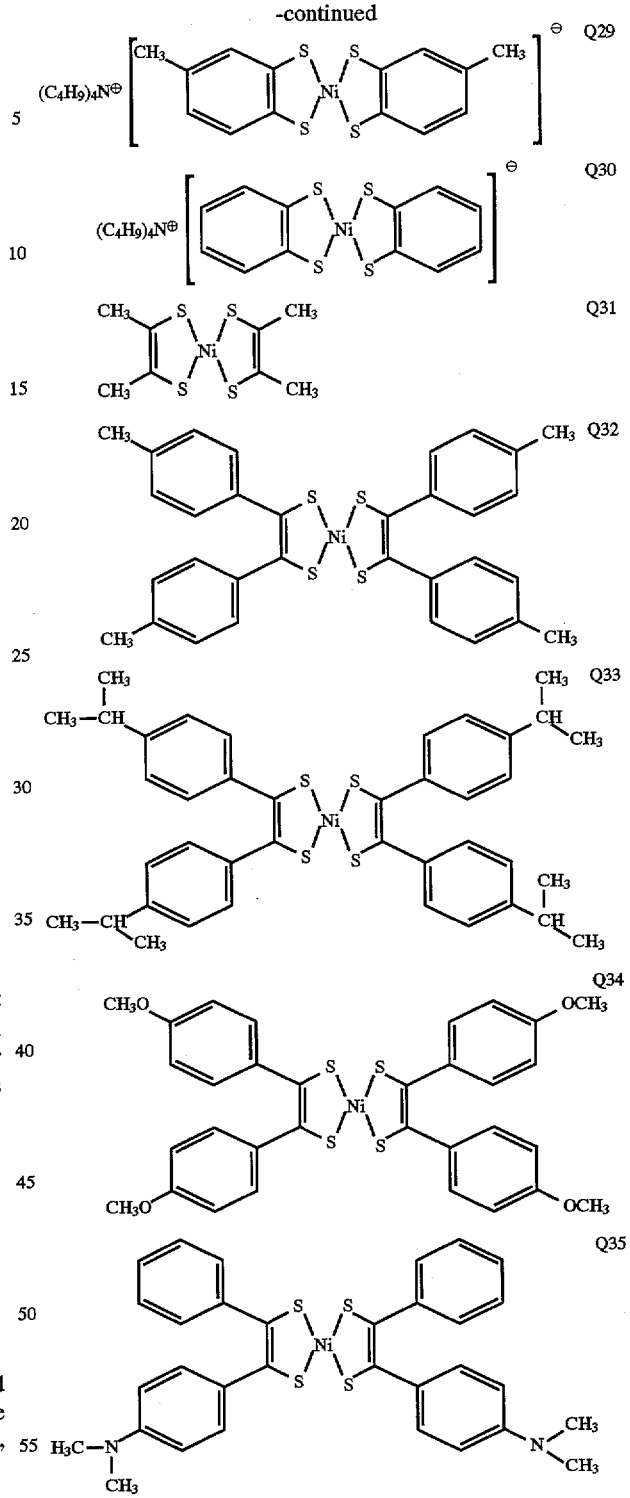

The method for preparation of the above types of the metal chelating compound is described in G. N. Schrauzer; Accounts of Chemical Research, Vol. 2, page 72 (1969).

The quenchers for singlet oxygen indicated above can be synthesized by methods known to the art.

The quencher for singlet oxygen is incorporated in the recording layer generally in an amount of 0.05 to 12 moles, preferably 0.1 to 1.2 moles, per mole of the aforementioned dye.

The recording layer described above may be deposited by coating the substrate utilizing any of the methods generally known to the art. The thickness of the recording layer thus deposited is generally in the range of about 0.03 to 2 μm, preferably 0.05–0.2 μm. In the case where the recording layer is formed solely of the dye, the deposition of this layer may be accomplished by vacuum evaporation or spattering, for example. Optionally, this recording layer may contain another polymer or oligomer, any of a variety of plasticizers or other agents such as a surface active agent, an antistatic agent, a slidant, a stabilizer, or a dispersant in addition to the components described above.

Examples of the solvent to be advantageously used for aiding the application of the recording layer by spreading on the substrate are ketones such as methyl ethyl ketone, methyl isobutyl ketone and cyclohexanone, esters such as butyl acetate, ethyl acetate, carbitol acetate and butyl carbitol acetate, ethers such as methyl cellosolve and ethyl cellosolve, aromatic compounds such as toluene and xylene, and halogenated alkyl compounds such as dichloroethane.

The material of the substrate on which the recording layer is deposited is not particularly limited. It may be any of a variety of resins, glasses, ceramics or metals. The shape of the substrate is selected to suit the purpose for which the optical recording medium is used. The substrate may be in the shape of tape, disk, drum, belt or the like.

The substrate may include an underlying layer such as a reflection layer or a heat-storing layer as selected.

On the recording layer, a reflection layer which functions as a rear side when the substrate in use is transparent, a varying uppermost protective layer or a half-mirror layer may be superposed as needed.

The optical recording medium of this invention normally finds no use for such an underlying layer or a superposed reflection layer, however, because the dye contemplated by the present invention for incorporation in the recording layer itself possesses a very high reflectance.

The optical recording medium of the present invention may have a recording layer on one or both sides of the substrate.

Optionally, two substrates each having such a recording layer deposited on one side may be prepared, disposed parallel to each other with their recording layers opposed to each other across a prescribed space, and then wholly enclosed in situ in a tight container, for example, so as to be protected against dust and scratches.

In accordance with this invention, information can be written on the optical recording medium with extremely high sensitivity by the use of a semiconductor laser or light-emitting diode of a wavelength of 750, 780 and 830 nm.

The reason for the extremely high recording sensitivity is that the complex of this invention exhibits as high absorption coefficient of more than $10^5$ cm$^{-1}$ in particularly in the range of 0.05 to 0.2 μm.

In another aspect, the present invention is directed to an optical recording medium which has deposited on a substrate a recording layer containing a dye and at least one quencher. This recording layer may additionally contain an autoxidizable compound or a thermoplastic resin. The recording layer may also contain an ultraviolet light absorbing agent in addition to the dye and the quencher. It may further contain a visible light absorbing agent in addition to the dye, the quencher, and the ultraviolet light absorbing agent.

The dye for use in the recording layer is desired to be a cyanine dye, preferably a cyanine dye represented by the general formula II.

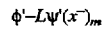   (II)

wherein φ' and ψ' each denote the residue of a thiazole ring, selenazole ring, an imidazole ring, or a pyridine ring which may form a polycondensate with a benzene ring or a naphthalene ring, L denotes a combining group for formation of a mono-, di-, tri-, or tetra-carbocyanine, X$^-$ denotes an anion, and m denotes 0 or 1.

In this case, φ' and ψ' are so related to each other that φ' possesses a plus (+) electron charge in the N atom of the ring and ψ' possesses a neutral N atom. And, they may be like or unlike each other. They may each have a varying substituent bonded thereto.

Among other possible combinations of φ' and ψ', the combination in which φ' and ψ' are like each other is particularly desirable. They are desired each to be any of the groups indicated by the following formulas XXII through XXXII. For the sake of simplicity, they both will be represented as φ' herein below.

   (XXII)

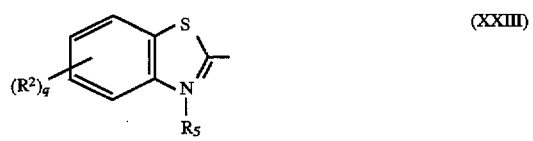   (XXIII)

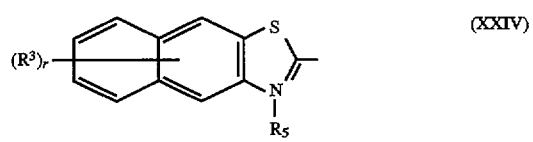   (XXIV)

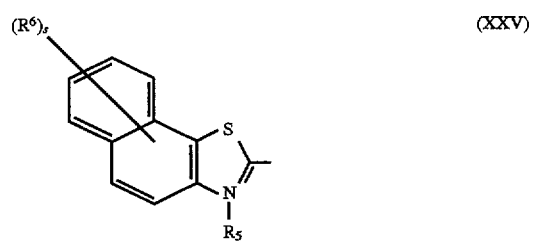   (XXV)

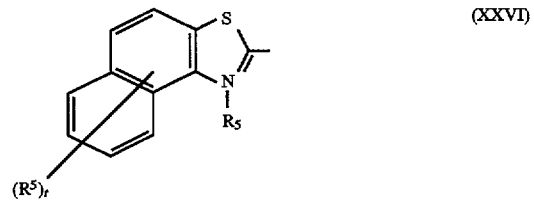   (XXVI)

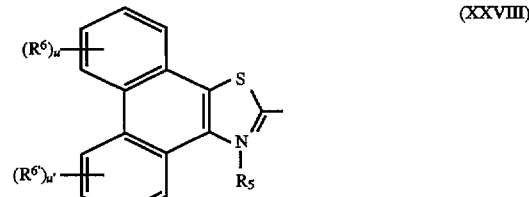   (XXVII)

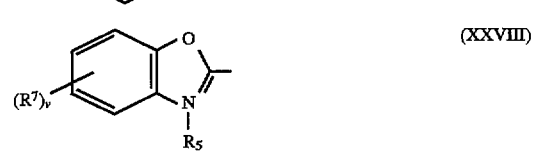   (XXVIII)

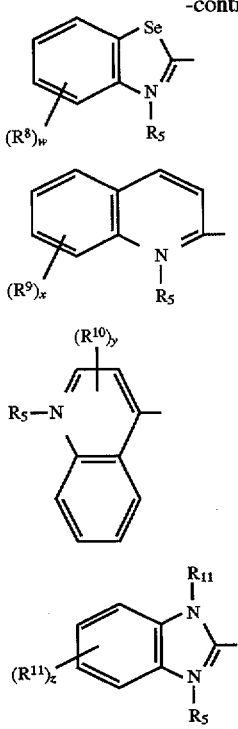

In the formulas given above, $R_5$ and $R_{11}$ each denote a substituted or unsubstituted alkyl group or aryl group. In this case, the number of carbon atoms in the alkyl group is from one to five. Examples of substituents advantageously used for the substitution of the alkyl group include sulfonic acid group, alkylcarboxyoxy groups, alkylamide groups, alkyloxy groups, and hydroxyl group. When the symbol m which will be described afterward is 0, $R_5$ in φ' has a minus (−) electron charge. $R^1$, $R^2$, $R^3$, $R^4$, $R^5$, $R^6$, $R^{6'}$, $R^7$, $R^8$, $R^9$ and $R^{10}$ each denote a substituent, which is alkyl group, aryl group, heterocyclic residue, halogen atom, alkoxy group, alkylthio group, alkylhydroxycarbonyl group or carboxylic acid group. And, p, q, r, s, t, u, u', v, w, x, y and z each denote an integer of the value of either 0 or at least 1. Generally, the value of this integer is from 0 to 4.

L denotes a combining group for formation of mono-, di-, tri- or tetra-cyanine dye. It is particularly desired to be any of the groups represented by the aforementioned formulas X through XXI.

In the groups represented by the formulas X through XXI, the tricarbocyanine combining groups, preferably those of the formulas X through XII and XVIII, are particularly advantageous. In these formulas, $X^-$ and m have the same meanings as in general formula I.

Concrete examples of the light absorbing dyes contemplated by this invention will be cited in Table 2. It should be noted, however, that the dyes given in his table are not the only dyes with which the present invention can be practiced.

TABLE 2

| Dye No. | Φ', ψ' | $R_5$, $R_{11}$ | $R^1$–$R^{10}$ | L | Y | X |
|---|---|---|---|---|---|---|
| $D_{21}$ | [XXII] | $C_2H_5$ | 4-$CH_3$ | [X] | H | I |
| $D_{22}$ | [XXII] | $CH_3$ | 4-$CH_3$ | [X] | H | I |
| $D_{23}$ | [XXIII] | $C_2H_5$ | — | [X] | H | $ClO_4$ |
| $D_{24}$ | [XXIII] | $C_2H_5$ | 5-$C_1$ | [X1] | $N(C_6H_5)_2$ | $ClO_4$ |
| $D_{25}$ | [XXIII] | $C_2H_5$ | 5-O $CH_3$ | [X] | H | I |
| $D_{26}$ | [XXIII] | $C_2H_5$ | (5-O $CH_3$, 6-O $CH_3$) | [X] | H | I |
| $D_{27}$ | [XXIII] | $C_2H_5$ | — | [XII] | — | I |
| $D_{28}$ | [XXIII] | $C_2H_5$ | — | [X] | H | I |
| $D_{29}$ | [XXIII] | $C_2H_5$ | — | [XVII] | H | $ClO_4$ |
| $D_{30}$ | [XXIII] | $C_2H_5$ | — | [X] | $CH_3$ | I |
| $D_{31}$ | XXIII | $C_2H_5$ | — | [XIII] | H | I |
| $D_{32}$ | XXIII | $C_2H_5$ | — | [XV] | H | I |
| $D_{33}$ | XXIII | $C_2H_5$ | — | [XVII] | — | I |
| $D_{34}$ | XXIV | $(CH_2)_5OCOCH_3$ | — | [XI] | $N(C_6H_5)_2$ | $ClO_4$ |
| $D_{35}$ | XXIV | $CH_2CH_2OH$ | 5-$C_1$ | [X] | H | $ClO_4$ |
| $D_{36}$ | XXV | $C_2H_5$ | — | [X] | H | $ClO_4$ |
| $D_{37}$ | XXVI | $C_2H_5$ | — | [X] | H | I |
| $D_{38}$ | XXVI | $C_2H_5$ | — | XI | N⟩COOC$_2$H$_5$ | $ClO_4$ |
| $D_{39}$ | XXVI | $C_2H_5$ | — | XI | 0 $CH_5$ | I |
| $D_{40}$ | XXVII | $C_2H_5$ | — | X | H | I |
| $D_{41}$ | XXVIII | $CH_2CH_2OH$ | — | X | H | $ClO_4$ |
| $D_{42}$ | XXIX | $C_2H_5$ | — | X | H | I |
| $D_{43}$ | XXIX | $(CH_2)_3OCOCH_3$ | — | X | N⟩COOC$_2$H$_5$ | $ClO_4$ |
| $D_{44}$ | XXX | $C_2H_5$ | — | X | H | I |
| $D_{45}$ | XXX | $CH_2CH_2CH_2SO_3H$ | — | X | $N(C_6H_5)_2$ | $ClO_4$ |

TABLE 2-continued

| Dye No. | Φ', ψ' | R$_5$, R$_{11}$ | R$^1$–R$^{10}$ | L | Y | X |
|---|---|---|---|---|---|---|
| D$_{46}$ | XXX | C$_2$H$_5$ | — | XI | N(C$_6$H$_5$)$_2$ | I |
| D$_{47}$ | XXXI | C$_2$H$_5$ | — | X | H | ClO$_4$ |
| D$_{48}$ | XXXII | C$_2$H$_5$ | — | X | H | ClO$_4$ |

The quencher for use in the recording layer should preferably be capable of quenching singlet oxygen. Concrete examples of the quencher are as already described above. Concrete examples of the autoxidizable compound and the thermoplastic resin are similarly as already described above.

When the recording layer contains the dye in combination with a quencher for singlet oxygen, the absorption wavelength of the quencher for singlet oxygen should preferably be at least 50 nm higher than that of the dye. The dye which is incorporated in the recording layer in combination with a quencher for singlet oxygen having such a long wavelength is not particularly limited. Any of the dyes of the cyanine type, the phthalocyanine type, the naphthalocyanine type, the choline or cholol type, the anthraquinone type, the azo type, the triphenylmethane type, squalyrium type and the pyrylium or thiapyrylium salt type can be used.

Among the many dyes available for the present invention, it is with the cyanine dyes that the quencher for singlet oxygen is particularly effective in preventing the coexisting dye from degradation by oxidation. When a cyanine dye is selected, this invention manifests its effect to an outstanding extent.

Among the cyanine dyes, those represented by the following general formula Ia prove to be particularly advantageous.

$$\phi'''=L\psi'''(X_-)_m \quad \text{(Ia)}$$

In the foregoing general formula Ia, φ''' and ψ''' each denote an aromatic ring such as a benzene ring, a naphthalene ring, an indole ring which may be polycondensed with a phenanthaene ring, a thiazole ring, an oxazole ring, a selenazole ring, an imidazole ring or a pyridine ring, for example.

These φ''' and ψ''' may be the same or different although they are generally similar. These rings may each have a varying substituent bonded thereto . In this case, φ''' has a plus (+) electron charge in the nitrogen atom of the ring and ψ''' has a neutral nitrogen atom in the ring.

These φ''' and ψ''' are each desired to have any of the backbone rings represented by the aforementioned formulas V through VIII, the formulas XXII through XXXII, and the following formula IX.

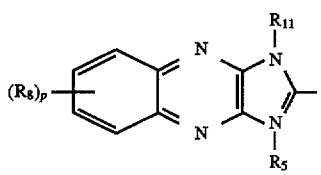

In any of the various rings, the group R$_5$ or R$_{11}$ bonded to a nitrogen atom of the imidazole ring is a substituted or unsubstituted alkyl group or aryl group.

The number of carbon atoms in the groups R$_5$ and R$_{11}$ which are bonded to the nitrogen atoms in the ring is not specifically limited. If the groups are substituted, examples of the substituent advantageously bonded to the group are sulfonic acid groups, alkylcarbonyloxy groups, alkylamide groups, alkylsulfonamide groups, alkoxyoxy groups, alkylamino groups, alkylcarbamoyl groups, alkylsulfamoyl groups, hydroxyl groups and halogen atoms.

When the symbol m which will be described hereinafter is 0, the group R$_5$ which is bonded to the nitrogen atom in φ''' is a substituted alkyl or aryl group and has a minus (−) electron charge.

Where the rings of φ''' and ψ''' are a polycondensed or unpolycondensed indole ring (formula V through VIII), two substituents R$_6$, R$_7$ are desired to be bonded to the 3 position thereof. The two substituents R$_6$, R$_7$ which are bonded to the 3 position in this case are each desired to be an alkyl group or an aryl group. In the alkyl groups and the aryl groups available for this purpose, an unsubstituted alkyl group having one or two, preferably one, carbon atoms proves particularly advantageous.

Separately, yet another substituent R$_8$ or R' through R" may be bonded to a prescribed position in any of the rings represented by φ''' and ψ'''. Examples of substituents which prove advantageous in this case include alkyl groups, aryl groups, heterocyclic groups, halogen atoms, alkoxy groups, alkylthio groups, alkyloxycarbonyl groups, alkylcarbonyloxy groups and carboxylic acid groups. Generally the number of such substituents (p, q, r, s, t, u, v, w, x, y and z) is either 0 or from 1 to 4. Where p, q, r, s, u, v, w, x, y and z each denote an integer of 2 or more, the plurality of R$_8$'s or R' through R"'s may be the same or different.

In all the dyes described above, those having a polycondensed or unpolycondensed indole ring as represented by the formulas V through VIII prove to be particularly advantageous. This is because they excel in coating property and stability, exhibit very high magnitudes of reflectance, and permit the C/N ratio of read signal to be notably increased.

The symbol L denotes a combining group for formation of a mono-, di-, tri- or tetra-cyanine dye.

It is particularly desired to be any of the combining groups represented by the aforementioned formulas X through XXI preferably the formulas X through XV and formula XVII, and most preferably formulas X and XI. X⁻ denotes an anion. Preferred examples of the anion are I⁻, Br⁻, ClO$_4$⁻, BF$_4$⁻,

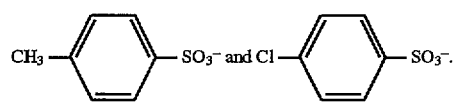

The concrete examples of the light absorbing dyes of the foregoing description include those listed in Table 3 below, besides those already listed in Table 1 and Table 2. It should be noted, however, that they are not the only dyes with which can be employed in the present invention.

TABLE 3

| Dye. No. | φ''', Ψ''' | $R_5, R_5'$ | $R_6, R_7$ | $R_8, R^1\sim R^{11}$ | L | Y | X |
|---|---|---|---|---|---|---|---|
| $D_{49}$ | VI | $C_8H_{17}$ | $CH_3$ | — | X | H | $ClO_4$ |
| $D_{50}$ | VII | $\begin{cases} C_7H_{14}COO^- \\ C_7H_{14}COOH \end{cases}$ | $CH_3$ | — | X | H | — |
| $D_{51}$ | VII | " | $CH_3$ | — | XI | $-N\underset{\phantom{x}}{\bigcirc}N-COOC_2H_5$ | — |
| $D_{57}$ | VII | $C_7H_{14}COOC_2H_5$ | $CH_3$ | — | X | H | $BF_4$ |
| $D_{53}$ | VII | $C_5H_{11}$ | $CH_3$ | — | XI | $-N(C_6H_5)_2$ | $ClO_4$ |
| $D_{54}$ | VII | $C_{18}H_{37}$ | $CH_3$ | — | X | H | $ClO_4$ |
| $D_{55}$ | VII | $C_8H_{17}$ | $CH_3$ | — | X | H | I |
| $D_{56}$ | V | $C_{17}H_{34}COOCH_3$ | $CH_3$ | — | X | H | I |
| $D_{57}$ | V | $C_8H_{16}OCOCH_3$ | $CH_3$ | — | XI | $-N(C_6H_5)_2$ | I |
| $D_{58}$ | V | $C_8H_{17}$ | $C_2H_5$ | — | X | H | I |
| $D_{59}$ | V | $C_7H_{15}$ | $C_2H_5$ | — | X | H | I |
| $D_{60}$ | VI | $C_{17}H_{34}COOCH_3$ | $CH_3$ | — | X | H | $ClO_4$ |
| $D_{61}$ | VI | $C_8H_{16}CH_2OCOCH_3$ | $CH_3$ | — | XI | $-N\underset{\phantom{x}}{\bigcirc}N-COOC_7H_5$ | I |
| $D_{62}$ | VI | $C_{17}H_{35}$ | $CH_3$ | — | XII | $-N\underset{\phantom{x}}{\bigcirc}N-COOC_2H_5$ | $ClO_4$ |
| $D_{63}$ | VI | $C_7H_{14}COOCH_3$ | $C_2H_5$ | — | X | H | $ClO_4$ |
| $D_{64}$ | VII | $C_7H_{14}CH_2OH$ | $CH_3$ | — | X | H | $ClO_4$ |
| $D_{65}$ | VII | $C_7H_{14}CH_2OCOC_2H_5$ | $CH_3$ | — | X | H | I |
| $D_{66}$ | VII | $C_{17}H_{34}COOC_2H_5$ | $CH_3$ | — | XI | $-N(C_6H_5)_2$ | I |
| $D_{67}$ | VII | $C_{17}H_{35}$ | $CH_3$ | — | VII | H | I |
| $D_{68}$ | VII | $C_7H_{15}$ | $C_2H_5$ | — | X | H | I |
| $D_{67}$ | VIII | $C_7H_{15}$ | $CH_3$ | — | X | H | I |
| $D_{68}$ | VIII | $C_7H_5$ | $CH_3$ | — | X | H | $ClO_4$ |
| $D_{69}$ | VIII | $C_{17}H_{35}$ | $CH_3$ | — | X | H | $ClO_4$ |
| $D_{70}$ | VIII | $C_{17}H_{34}CH_2OCOCH_3$ | $CH_3$ | — | X | H | I |
| $D_{71}$ | XXIII | $C_8H_{17}$ | 4-$CH_3$ | — | X | H | I |
| $D_{72}$ | XXIII | $C_{18}H_{37}$ | — | — | X | H | I |
| $D_{73}$ | XXIII | $C_8H_{17}$ | — | — | X | H | $ClO_4$ |
| $D_{74}$ | XXIII | $C_8H_{17}$ | 5-Cl | — | X | H | $ClO_4$ |
| $D_{75}$ | XXIII | $C_{18}H_{37}$ | 5-Cl | — | X | II | I |
| $D_{76}$ | XXIII | $C_8H_{17}$ | $\begin{cases} 5\text{-O }CH_3 \\ 6\text{-O }CH_3 \end{cases}$ | — | X | H | I |
| $D_{77}$ | XXIII | $C_8H_{17}$ | 5-O $CH_3$ | — | XII | — | I |
| $D_{78}$ | XXIII | $C_8H_{17}$ | 5-Cl | — | XI | $-N(C_6H_5)_2$ | I |
| $D_{79}$ | XXIII | $C_{18}H_{37}$ | 5-Cl | — | XI | $-N(C_6H_5)_2$ | $ClO_4$ |
| $D_{80}$ | XXIII | $C_8H_{17}$ | — | — | X | $-N\underset{\phantom{x}}{\bigcirc}-COOC_2H_5$ | I |
| $D_{81}$ | XXIII | $C_8H_{17}$ | — | — | X | H | I |

TABLE 3-continued

| Dye No. | | $R_5, R_5'$ | $R_6, R_7$ | $R_8, R^1\sim R^{11}$ | L | Y | X |
|---|---|---|---|---|---|---|---|
| $D_{82}$ | XXIII | $C_{18}H_{37}$ | 5-Cl | — | X | H | $ClO_4$ |
| $D_{83}$ | XXIII | $C_{18}H_{37}$ | 5-Cl | — | X | H | ⌬–$SO_3$ (C-phenyl-SO₃) |
| $D_{84}$ | XXIII | $C_8H_{17}$ | — | — | XIII | H | I |
| $D_{85}$ | XXIII | $C_8H_{17}$ | — | — | XV | H | I |
| $D_{86}$ | XXIII | $C_8H_{17}$ | — | — | XVII | — | I |
| $D_{87}$ | XXIV | $C_8H_{17}$ | — | — | XI | $N(C_6H_5)_2$ | $ClO_4$ |
| $D_{88}$ | XXIV | $C_{18}H_{37}$ | — | — | X | H | $ClO_4$ |
| $D_{89}$ | XXIV | $C_{13}H_{27}$ | — | — | X | H | $ClO_4$ |
| $D_{90}$ | XXIV | $C_{13}H_{27}$ | — | — | X | H | I |
| $D_{91}$ | XXIV | $C_8H_{17}$ | — | — | XI | N⌬COOC₂H₅ (piperidine-COOC₂H₅) | $ClO_4$ |
| $D_{92}$ | XXIV | $C_8H_{17}$ | — | — | XI | O CH₃ | I |
| $D_{93}$ | XXIV | $C_{18}H_{37}$ | — | — | X | H | I |
| $D_{94}$ | XXIV | $C_8H_{17}$ | — | — | X | H | CH–⌬–SO (phenyl-SO) |
| $D_{95}$ | XXIV | $C_{18}H_{37}$ | — | — | XI | $N(C_6H_5)_2$ | $ClO_4$ |
| $D_{96}$ | XXVIII | $C_8H_{17}$ | — | — | X | H | $ClO_4$ |
| $D_{97}$ | XXIX | $C_8H_{17}$ | — | — | X | H | I |
| $D_{98}$ | XXIX | $C_8H_{17}$ | — | — | XI | N⌬COOC₂H₅ | $ClO_4$ |
| $D_{99}$ | XXIX | $C_{13}H_{27}$ | 5-Cl | — | X | H | I |
| $D_{100}$ | XXIX | $C_8H_{17}$ | — | — | XI | $N(C_6H_5)_2$ | $ClO_4$ |
| $D_{101}$ | XXIX | $C_{18}H_{37}$ | — | — | XI | $N(C_6H_5)_2$ | I |
| $D_{102}$ | XXXI | $C_8H_{17}$ | — | — | X | H | $ClO_4$ |
| $D_{103}$ | XXXII | $C_8H_{17}$ | — | — | X | H | $ClO_4$ |
| $D_{104}$ | XXII | $C_8H_{17}$ | — | — | X | H | $ClO_4$ |
| $D_{105}$ | XXV | $C_8H_{17}$ | — | — | X | H | $ClO_4$ |
| $D_{106}$ | XXX | $C_8H_{17}$ | — | — | X | H | $ClO_4$ |
| $D_{107}$ | V | $C_2H_5$ | $CH_3$ | $CH_3CO-$ | XIV | $N(C_6H_5)_2$ | $ClO_4$ |
| $D_{108}$ | VII | $CH_3$ | $CH_3$ | — | XIV | $N(C_6H_5)_2$ | $ClO_4$ |
| $D_{109}$ | VII | $CH_2CH_2OCOCH_3$ | $CH_3$ | — | XIV | $N(C_6H_5)_2$ | $ClO_4$ |

| Dye No. | | $R_5, R_5'$ | $R_6, R_7$ | $R_8, R^1\sim R^{11}$ | L | Y | X |
|---|---|---|---|---|---|---|---|
| $D_{110}$ | VII | $C_4H_9$ | $CH_3$ | $CH_3CO-$ | XIV | $N(C_6H_5)_2$ | $ClO_4$ |
| $D_{111}$ | V | $CH_2CH_2OCOCH_3$ | " | — | X | H | Br |
| $D_{112}$ | VII | " | " | — | X | H | " |
| $D_{113}$ | VI | $CH_3$ | " | — | XIV | $N(C_6H_5)_2$ | $ClO_4$ |
| $D_{114}$ | V | $CH_2CH_2OH$ | " | — | X | H | Br |
| $D_{115}$ | VII | $CH_2CH_2OG$ | " | — | X | H | " |
| $D_{116}$ | VII | $C_4H_9$ | " | — | X | H | $ClO_4$ |
| $D_{117}$ | VII | $CH_3$ | " | — | XVIII | Br | " |
| $D_{118}$ | VII | " | " | — | XIX | H | " |
| $D_{119}$ | VII | " | " | — | XX | $N(C_6H_5)_2$ | " |
| $D_{120}$ | VII | " | " | — | XXI | Br | " |

| Dye No. | φ, Ψ | $R_5, R_5'$ | $R_6, R_7$ | $R_8, R^1\sim R^{11}$ | L | Y | X |
|---|---|---|---|---|---|---|---|
| $D_{121}$ | V | $C_2H_5$ | $CH_3$ | $5-C_6H_5SO_2-$ | XVIII | Cl | I |
| $D_{122}$ | V | $C_2H_5$ | " | $5-C_6H_5SO_2-$ | XVIII | Cl | CH₃–⌬–SO₃ (tolyl-SO₃) |
| $D_{123}$ | V | $CH_3$ | " | " | XVIII | " | I |
| $D_{124}$ | V | $C_2H_5$ | " | " | XI | " | CH₃–⌬–SO₃ |

TABLE 3-continued

| | | | | | | | |
|---|---|---|---|---|---|---|---|
| $D_{125}$ | V | " | " | 5-$C_6H_5$CO— | XVIII | " | " |
| $D_{126}$ | V | " | " | " | XI | " | " |
| $D_{127}$ | V | " | " | 5-$CH_3SO_2$— | XI | $N(C_6H_5)_2$ | $ClO_4$ |
| $D_{128}$ | V | " | " | 5-$C_6H_5SO_2$ | XI | Cl | " |
| $D_{129}$ | V | " | " | " | XI | " | I |
| $D_{130}$ | V | " | " | " | XI | " |  |
| $D_{131}$ | V | " | " | " | XVIII | " | $BF_4$ |
| $D_{132}$ | V | $C_2H_5$ | $CH_3$ | " | XVIII | Cl | $ClO_4$ |
| $D_{133}$ | V | " | " | " | XVIII | " | " |
| $D_{134}$ | V | " | " | " | XVIII | " |  |
| $D_{135}$ | V | " | " | " | XVIII | " | Cl |
| $D_{136}$ | V | $CH_3$ | " | " | XVIII | " | $ClO_4$ |
| $D_{137}$ | V | " | " | " | XVIII | " | I |
| $D_{138}$ | V | n-$C_4H_9$ | " | " | XVIII | " | $ClO_4$ |
| $D_{139}$ | V | n-$C_6H_{15}$ | " | " | XVIII | " | " |
| $D_{140}$ | V | $(CH_2)_4SO_3^-$, $(CH_2)_4SO_3H$ | " | " | XVIII | " | — |
| $D_{141}$ | V | $C_2H_5$ | " | " | XVIII | | 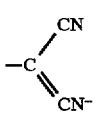 |
| $D_{142}$ | V | $CH_3$ | " | " | XVIII | " | — |
| $D_{143}$ | V | $C_2H_5$ | $CH_3$ | 5-$C_6H_5$CO— | XI | Cl | I |
| $D_{144}$ | V | " | " | " | XI | " | $ClO_4$ |
| $D_{145}$ | V | " | " | " | XI | " |  |
| $D_{146}$ | V | " | " | " | XVIII | " | $ClO_4$ |
| $D_{147}$ | V | " | " | " | XVIII | " | I |
| $D_{148}$ | V | " | " | " | XVIII | " |  |
| $D_{149}$ | IX | $CH_2CH=CH_2$ | — | — | XVII | H | " |
| $D_{150}$ | V, IX | $CH_3$, $CH_2CH=CH_2$ | $CH_3$ | 5-$C_6H_5SO_2$ | XVII | " | " |
| $D_{151}$ | IX | $CH_2CH_2OCH_3$ | — | C | XVII | " | " |
| $D_{152}$ | IX | " | — | $C_6H_5SO_2$ | XVII | " | " |
| $D_{153}$ | IX | " | — | $C_6H_5$CO | XVII | " | $ClO_4$ |
| $D_{154}$ | IX | $CH_2CH_2OCH$ | $CH_3$ | $C_6H_5$CO | XVII | H | I |
| $D_{155}$ | XXIII, IX | " | — | Left $C_6H_5$CO right $NO_2$ | XVII | " | " |
| $D_{156}$ | IX | " | — | $NO_2$, Cl | XVII | " |  |
| $D_{157}$ | XXIII, IX | $CH_2CH_2OCH$, $(CH_2)_4SO_3^-$ | — | Left $C_6H_5SO_2$ right $NO_2$ | XVII | " | — |
| $D_{158}$ | IX | $CH_2CH_2OCH_3$ $(CH_2)_3N(CH_3)_2$ | — | $C_6H_5SO_2$ $NO_2$ | XVII | " | $CO_4$ |
| $D_{159}$ | IX | $C_6H_5$ | — | $C_5H_5SO_2$ | XVII | " | 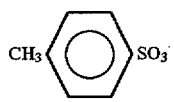 |

TABLE 3-continued

| | | | | | | | |
|---|---|---|---|---|---|---|---|
| $D_{160}$ | IX | $CH_2CH_2OCH_3$ | — | — | XVII | " | " |
| $D_{161}$ | IX | " | — | $NO_2$ | XVII | " | " |
| $D_{162}$ | IX | $CH_2CH=CH_2$ | — | " | XVII | " | $ClO_4$ |
| $D_{163}$ | IX | $CH_2CH_2OCH_3$ | — | $C_6H_5SO_2$ | XV | " | $CH_3\langle\bigcirc\rangle SO_3$ |
| $D_{164}$ | IX | " | — | " | XV | " | $C\ O_4$ |
| $D_{165}$ | IX | $CH_2CH=CH_2$ | — | $NO_2$ | XV | " | " |

These dyes can be easily synthesized by the method described in the article titled "Nitrogen-containing Heterocyclic Compounds I," page 432 of the Great Organic Chemistry (published by Asakura Shoten), with necessary modifications.

To be specific, such a dye is produced by first heating a corresponding $\phi_1'''$—$CH_3$ (wherein $\phi_1'''$ denotes a ring corresponding to the aforementioned $\phi'''$) with an excess of $R_5I$ (wherein $R_5$ denotes an alkyl group or aryl group) thereby causing attachment of $R_5$ to the nitrogen atom in $\phi_1'''$ to afford —$CH_3I^-$ and subsequently subjecting this product to dehydration polycondensation by the use of an unsaturated dialdehyde or an unsaturated oxyaldehyde and an alkali catalyst.

As the quencher for singlet oxygen to be used in this case, any of the compounds cited above and also those to be cited herein below can be adopted.

1) Bisphenyldithiol type

Q36—Co-bis(benzene-1,2-dithiol)-tetrabutyl ammonium salt

Q37—Co-bis(O-xylene-4,5-dithiol)-tetra(t-butyl)-ammonium salt

Q38—Ni-bis(benzene-1,2-dithiol)-tetrabutyl ammonium salt

Q39—Ni-bis(O-xylene-4,5-dithiol)-tetrabutyl ammonium salt

Q40—Ni-bis(5-chlorobenzene-1,2-dithiol)-tetrabutyl ammonium salt

Q41—Ni-bis(3,4,5,6-tetramethylbenzene-1,2-dithiol)-tetrabutyl ammonium salt

Q42—Ni-bis(3,4,5,6-tetrachlorobenzene-2-dithiol-tetrabutyl ammonium salt

2) Dithiocarbamic acid chelate type

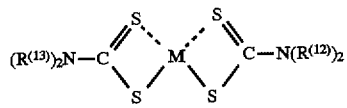

wherein $R^{(12)}$ and $R^{(13)}$ each denote an alkyl group and M denotes a divalent transient metal atom.

Q43—Ni-bis(dibutyl-dithiocarbamic acid) (produced by Sumitomo Chemical Industry Co., Ltd. and marketed under trademark designation of Antigen NBC).

3) Thiocatechol chelate type

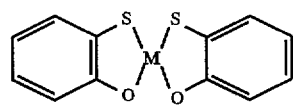

wherein M denotes a transient metal atom. Here, M possesses a minus (−) electron charge and may form a salt with an anion. The benzene ring may possess a substituent.

Q44—Ni-bis(thiocatechol)-tetrabutyl ammonium salt
Q45—Ni-2,2'-thiobis (4-tert.-octyl)-phenolate 4) Phosphonous acid chelate type

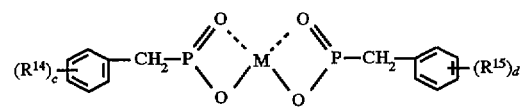

wherein M has the same meaning as above and $R^{(14)}$ and $R^{(15)}$ each denote a substituent such as alkyl group or hydroxyl group.

Q46

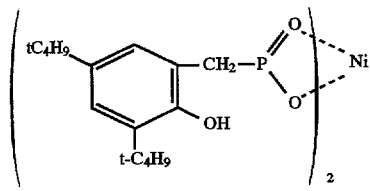

Bisdithio-α-diketone type

Q47

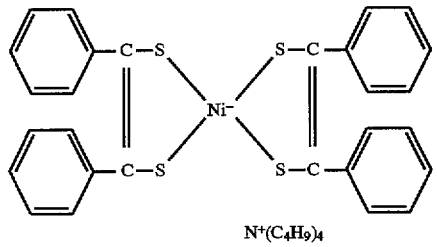

The quenchers for singlet oxygen indicated above can be synthesized in accordance with an ordinary method known to the art.

Such a quencher for singlet oxygen is incorporated in the recording layer generally in an amount of 0.05 to 12 moles, preferably 0.1 to 1.2 moles, per mole of the aforementioned dye.

The quencher for singlet oxygen thus used is required to have a maximum absorption wavelength at least 50 nm greater than the maximum absorption wavelength of the dye used in the recording layer.

Even if the quencher for singlet oxygen has no such absorption spectrum characteristic as described above, the singlet oxygen which is generated during the exposure of the recording medium to the reading beam owing to the transfer of energy or electron from the dye to be caused when the dye is excited by the light absorbed from the reading beam is converted by the quencher for singlet oxygen into a triplet state and, consequently, the degradation of the dye owing to the oxidation by the singlet oxygen is precluded and the degradation of reading signal after the recording is also prevented. When the optical recording medium using the same quencher is exposed for a long time to the ambient light such as the room light, however, the excitation of the quencher for singlet oxygen predominates over the quencher's expected effect upon the singlet oxygen and, consequently, the dye undergoes degradation by oxidation. Thus, the preservability of the optical recording medium in its original state under the ambient light and the preservability of the recorded information in the medium are lower than can be tolerated.

By contrast, when the maximum absorption wavelength of the quencher for singlet oxygen is at least 50 nm greater than the maximum absorption wavelength of the dye, the excitation of the quencher for singlet oxygen under the room light, for example, is negligibly small. Thus, the preservability of the optical recording medium under such ambient conditions is conspicuously high.

To permit size reduction of the whole device, it is desirable to use as the light source for the writing and reading beam either a laser diode rated for 750, 780 or 830 nm or a He—Ne laser rated for 633 nm, for example. In this connection, therefore, the maximum absorption wavelength of the quencher for singlet oxygen is required to be not less than 680 nm, desirably to be in the range of 680 to 1500 nm, and preferably to be in the range of 800 to 1500 nm.

The relation between the absorption coefficients of the dye (the actually available value where two or more dyes are used) and the quencher for singlet oxygen is required to be such that, where $\epsilon_D$ denotes the absorption coefficient of the coloring matter and $\epsilon_Q$ the absorption coefficient of the quencher, the ratio of $\epsilon_D/\epsilon_Q$ is desired to be not less than 3.

In case where two or more dyes are simultaneously used in one recording layer, the maximum absorption wavelength and the absorption coefficient $\epsilon_D$ of the combined dyes are actual values of additive averages proportionate to the concentrations of the plurality of dyes involved.

When this particular ratio is satisfied, the excitation of the quencher for singlet oxygen during the exposure of the optical recording medium to the reading beam is notably adapted and the degradation of reading signal by the singlet oxygen is immensely curbed.

The quencher possessing such an absorption spectrum characteristic is suitably selected to meet the conditions of the light source and the dye actually used.

When the optical recording medium is destined to be operated with a laser diode as its light source, the quencher for singlet oxygen which possesses such a desirable absorption characteristic may be one member selected from the group consisting of Q7, Q8, Q17, Q18, Q19, Q38, Q39, Q40 Q41, Q49 and Q47.

The recording layer for the optical recording medium of this invention is desired to incorporate therein a dye and at least two quenchers for singlet oxygen. This recording layer may also incorporate an autoxidizable compound or a thermoplastic resin. In this case, the dye, the autoxidizable compound, the thermoplastic resin, and the quencher for singlet oxygen are as already described above. The reason for the use of two or more quenchers for singlet oxygen in the recording layer is that such as notably diminishes such undesirable phenomena as crystallization, bleed out, and recoagulation of the components used in the recording layer, decreases the decline of S/N ratio or C/N ratio to a remarkable extent during the preservation, and notably improves the preservability of the medium in its original state and the preservability of recorded information.

In this case, although any number of quenchers for singlet oxygen above 2 may be used, it generally suffices to use only two such quenchers.

The ratio of the amounts of two or more quenchers for singlet oxygen to be used is not specifically limited. Generally, however, an auxiliary quencher is used in an amount of about 0.1 to 1 mole per mole of a main quencher.

The total amount of the plurality of quenchers to be incorporated in the recording layer is generally in the range of 0.05 to 12 moles, preferably 0.1 to 1.2 moles, per mole of the dye to be actually used.

In this case, the maximum absorption wavelength of at least one of the two quenchers for singlet oxygen is desired to be at least 50 nm greater than the maximum absorption wavelength of the dye. The function of the quenchers is as already described above.

To permit side reduction of the whole device, it is desirable to use as the light source for the writing and reading beam either a laser diode or He—Ne laser rated for 750, 780 or 830 nm, for example. In this connection, therefore, the maximum absorption wavelength of at least one of the quenchers for singlet oxygen is required to be not less than 680 nm, desirably to be in the range of 680 to 1500 nm, and preferably to be in the range of 800 to 1500 nm.

Further, the absorption coefficient $\epsilon_D$ of the dye at the wavelength of the reading beam (the actual available value when two or more dyes are used) and the actual available absorption coefficient $\epsilon_Q(\epsilon_Q=$ $$\epsilon_Q(\epsilon_Q = \sum_{i=1}^{n} C_i \epsilon_{Qi},$$

Ci $\epsilon_{Qi}$, wherein c denotes the concentration of Qi) of two or more quenchers for singlet oxygen are desired to satisfy the ratio, $\epsilon_D/\epsilon_Q$, of at least 3.

Optionally, the recording layer which is formed of a dye composition comprising a dye and a quencher may incorporate additionally therein an ultraviolet light absorbing agent. It may otherwise incorporate additionally therein a visible light absorbing agent. Of course, these recording layers may incorporate an autoxidizable compound or a thermoplastic resin as already described above.

The incorporation of the ultraviolet light absorbing agent by the recording layer may be accomplished in various methods. For example, the ultraviolet light absorbing agent may be added to the recording layer.

Otherwise, a layer containing the ultraviolet light absorbing agent may be superposed on the recording layer.

The optical recording medium of this invention is desired to effect the writing and reading of information on the substrate side of the medium. In this connection, the ultraviolet light absorbing agent is desired to be contained in the substrate or to be contained in a separate layer which is deposited as a coating layer for the surface of the substrate.

The content of the ultraviolet light absorbing agent is so fixed that the layer containing it will exhibit a transmittance of not more than 1% at 350 nm.

In this case, the incorporation of the ultraviolet light absorbing agent into the substrate may be effected by causing this agent to be kneaded into the resin such as, for example, polymethyl methacrylate or polycarbonate which is used as the material for the substrate when the resin is being molded.

When the coating layer is formed, this layer may be formed solely of the ultraviolet light absorbing agent. Generally, however, it suffices to have the ultraviolet light absorbing agent dissolved in the aforementioned thermoplastic resin or a thermosetting resin which is to be deposited in the form of a coating layer. The thickness of such a coating layer is selected in the range of about 1 to 100 μm. The ultraviolet light absorbing agent to be used in the optical recording medium of this invention is not specifically limited. Generally, it is desired to have an absorption coefficient of at least $10^4$ cm$^{-1}$ at 280 nm.

A) Salicylic ester type compounds

UV1—Phenyl salicylate

UV2—p-tert-Butylphenyl salicylate

UV3—p-Octylphenyl salicylate

B) Benzophenone type compounds

UV4—2,4-Dihydroxybenzophenone

UV5—2-Hydroxy-4-methoxybenzophenone

UV6—2-Hydroxy-4-octoxybenzopheone

UV7—2-Hydroxy-4-dodecyloxybenzophenone

UV8—2,2'-Dihydroxy-4-methoxybenzophenone

UV9—2,2'-dihydroxy-4,4'-dimethoxybenzophenone

UV10—2,2'-Hydroxy-4-methoxy-5-sulfobenzophenone

C) Benzotriazole type compounds

UV11—2-(2'-Hydroxy-5'-methylphenyl)-benzotriazole

UV12—2-(2'-Hydroxy-5'-tert.-butylphenyl)-benzotriazole

UV13—2-(2'-Hydroxy-3', 5'-di-tert.-butylphenyl)-benzotriazole

UV14—2-(2'-Hydroxy-3'-tert.-butyl-5'-methylphenyl)-5-chlorobenzotriazole

UV15—2-(2'-Hydroxy-3', 5'-di-tert.-butylphenyl)-5-chlorobenzotriazole

UV16—2-(2'-Hydroxy-3', 5'-di-tert.-amylphenyl)-benzotriazole

UV17—2-(2'-Hydroxy-4'-octoxyphenyl)-benzotriazole

D) Cyanoacrylate type compounds

UV18—2-Ethylhexyl-2-cyano-3,3'-diphenyl acrylate

UV19—Ethyl-2-cyano-3,3'-diphenyl acrylate

For the purpose of this invention, two or more ultraviolet light absorbing agents may be used simultaneously.

Besides the quenchers mentioned above, those indicated below are also available for incorporation in the recording layer of this invention.

1) Bisphenyl thiol type

Q48—Ni-bis(octylphenyl)-sulfite

3) Thiobisphenolate chelate type

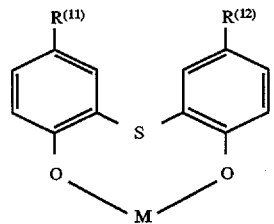

wherein M has the same meaning as above and $R^{(11)}$ and $R^{(12)}$ each denote an alkyl group and M possesses a minus (−) electron charge and may form a salt with a cabion.

Q49—Co-n-butylamino[2,2'-thiobis(4-tert.-octyl)-[phenolate]

Q50—Ni-2,2'-thiobis-(4-tert.-octyl)-phenolate Besides those given above, the quenchers to be shown below are also available.

4) Benzoate type

Q51—Existing chemical substance, 3-3040[Thinuvin-120 (product by Ciba-Geigy)]

Q52—Existing chemical substance, 5-3732[SANOL LS-770 (product by Sankyo Pharmaceutical)]

These quenchers can be synthesized by a methods known to the art.

From among the quenchers which possess the absorption characteristic defined by this invention, the particular quencher that suits the light source and the dye to be actually used will be selected for incorporation in the recording layer.

Amongst the various quenchers indicated above, the particular quencher which exhibits the absorption characteristic more advantageously when the laser diode is used as the light source is selected from the group consisting of Q7, Q8, Q17, Q18, Q19, Q20, Q21, Q34, Q39, Q40, Q41, Q42, Q43, Q46, Q47, Q51 and Q52.

The visible light absorbing agent is incorporated into the optical recording medium in much the same manner as the aforementioned ultraviolet light absorbing agent.

The content of the visible light absorbing agent in the medium is so fixed that the recording layer will acquire transmittance of not more than 20% relative to the white light of 400 to 700 nm.

Although the visible light absorbing agent is not specifically limited, it is desired to possess a maximum absorption coefficient of not less than $10^3$ cm$^{-1}$ in the wavelength range of 400 to 700 run.

By this reason, solvent yellow, solvent red, solvent blue, solvent green, solvent orange, solvent violet and solvent black which have been employed as dyes for coloring plastics are also available as visible light absorbing agents.

Of all these visible light absorbing agents, those which prove particularly advantageous are as follows.

a) Phthalocyanine type $V_1$—Aizenspiron Blue-GNH (product of Hodogaya Chemical)

$V_2$—Aizenspiron Blue-2BNH (same as above)

$V_3$—Oleosol Fast Blue-EL (product of Sumitomo Chemical)

b) Azo type, particularly azochrome chelate type $V_4$—Aizenspiron Black BH Special (product of Hodogaya Chemical)

$V_5$—Oleosol Fast Black-BL (product of Sumitomo chemical )

$V_6$—Oleosol Fast Red-BL (same as above)
$V_7$—Oleosol Fast Pink-BL (same as above)
$V_8$—Oleosol Fast Yellow-2B (same as above)
$V_9$—Oleosol Fast Yellow-GCN (same as above)

c) Anthraquinone type
$V_{10}$—Sudan Blue-11
$V_{11}$—Sumiplast Blue-OR (product of Sumitomo chemical )
$V_{12}$—Sumiplast Green-G (same as above)

d) Quinophthalone type d) Metin type f) Polycondensed polycyclic type

Optionally, the visible light absorbing agents may be used in the form of various combinations of two or more members.

The recording layer incorporating the various components indicated above can be deposited on the substrate in much the same way as described above.

Where a thermoplastic resin is used in the recording layer, the pits once formed in the recording layer can be erased by light or heat so that the recording layer will be readied for reuse.

In this case, the He—Ne laser, for example, may be used as the source for the recording or reading beam.

Although the writing and reading may be effected in either direction, it is desired to be carried out from the rear side of the substrate.

The present invention further relates to an optical recording medium which has deposited on a substrate a recording layer incorporating therein a light absorbing dye represented by the general formula III.

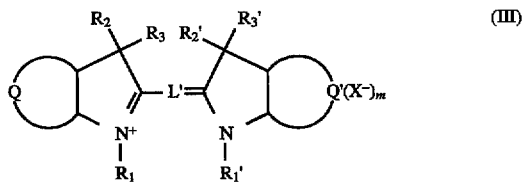
(III)

wherein Q and Q' each denote a polycondensed aromatic ring, $R_1$ and $R_1'$ each denote a substituted or unsubstituted alkyl group having more than four carbon atoms, $R_2$, $R_2'$, $R_3$ and $R_3'$ each denote an alkyl group or aryl group, L'denotes a combining group for formation of a cyanine, $X^-$ denotes an anion, and m denotes 0 or 1. This recording layer may additionally incorporate therein a resin or a quencher for singlet oxygen or both.

In the aforementioned formula I, Q and Q' may be like or unlike each other. Generally, they are like each other.

The polycondensed ring formed by Q may have a varying substituent bonded thereto.

Of the various benzindole rings formed by the polycondensation of Q and Q', those which are particularly advantageous are represented by the following formulas XXXIII through XXXVI. In this case, these formulas are expressed with rings which are formed by the polycondensation of Q.

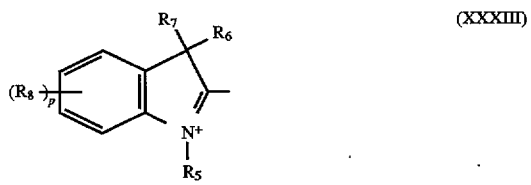
(XXXIII)

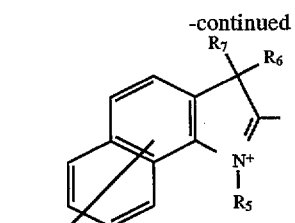
(XXXIV)

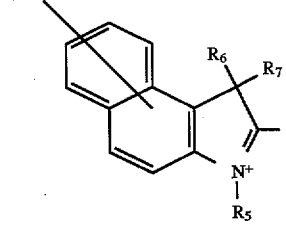
(XXXV)

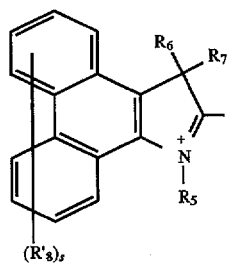
(XXXVI)

In the formulas given above, $R_8$ denotes hydrogen atom, a halogen atom, an alkyl group, an alkoxy group, an aryl group, an alkyloxycarbonyl group or a carboxylic acid group, p denotes an integer of 0 or up to 4, and q, r and s each denote an integer of 0 or up to 6.

$R_5$ and $R_5'$ each denote a substituted or unsubstituted alkyl group.

The number of atoms of $R_5$ and $R_5'$ is each at least 4. When the number of carbon atoms is less than 4, the effect of this invention is not materialized.

If the number of carbon atoms is excessively large, the absorption coefficient is lowered and the instability and the production cost are increased. Thus, the number of carbon atoms is from 4 to 19. Still better results are obtained when the number of carbon atoms is limited to the range of 5 to 18, preferably to the range of 6 to 18.

When $R_5$ is a substituted alkyl group, examples of the substituent which are advantageous for the substitution involved herein include sulfonic acid group, alkylcarboxyoxy groups, halogen atoms, hydroxyl group, alkyl-substituted amino groups and alkyloxycarbonyl groups.

When the symbol m which will be described afterward is 0, $R_5$ possesses a minus (−) electron charge.

And, $R_6$ and $R_7$ each denote an aryl group such as phenyl group or alkyl group, preferably an alkyl group. In this case, the alkyl group is in an unsubstituted state having 1 or 2 carbon atoms, preferably 1 carbon atom.

Then, L denotes a combining group for formation of a mono-, di-, tri- or tetra-cyanine. It is particularly desired to be one of the groups represented by the aforementioned formulas X through XXI. $X^-$ and m have the same meanings as above.

Concrete examples of light absorbing dye suitable for the purpose of this invention will be shown below. It should be noted, however, that they are not the only light absorbing dye with which can be employed in the present invention.

TABLE 4

| Dye No. | Q, Q' | $R_5$, $R'_5$ | $R_6$, $R'_6$ | $R_7$, $R'_7$ | L | Y | X |
|---|---|---|---|---|---|---|---|
| $D_{166}$ | XXXIII | $-C_{17}H_{35}$ | $-CH_3$ | $-CH_3$ | X | H | I |
| $D_{167}$ | XXXIII | $-C_4H_9$ | $-CH_3$ | $-CH_3$ | X | H | $ClO_4$ |
| $D_{168}$ | XXXIII | $-C_8H_{16}OCOCH_5$ | $-CH_3$ | $-CH_3$ | XI | $-N(C_6H_5)_2$ | $ClO_4$ |
| $D_{169}$ | XXXIII | $-C_7H_{14}CH_2OH$ | $-CH_3$ | $-CH_3$ | X | H | I |
| $D_{170}$ | XXXIV | $-C_8H_{17}$ | $-CH_3$ | $-CH_3$ | X | H | $ClO_4$ |
| $D_{171}$ | XXXV | $(-C_7H_{14}COO-\ -C_7H_{14}COOH)$ | $-CH_3$ | $-CH_3$ | X | H | — |
| $D_{172}$ | XXXV | " | $-CH_3$ | $-CH_3$ | XI | $-N\smash{\bigcirc}N-COOC_2H_5$ | — |
| $D_{173}$ | XXXV | $-C_7H_{14}COOC_2H_5$ | $-CH_3$ | $-CH_3$ | X | H | $BF_4$ |
| $D_{174}$ | XXXV | $-C_5H_{11}$ | $-CH_3$ | $-CH_3$ | XI | $-N(C_6H_5)_2$ | $ClO_4$ |
| $D_{175}$ | XXXV | $-C_{18}H_{37}$ | $-CH_3$ | $-CH_3$ | X | H | $ClO_4$ |
| $D_{176}$ | XXXV | $-C_8H_{17}$ | $-CH_3$ | $-CH_3$ | X | H | I |
| $D_{177}$ | XXXV | $-C_{17}H_{34}COOCH_3$ | $-CH_3$ | $-CH_3$ | X | H | I |
| $D_{178}$ | XXXV | $-C_8H_{16}OCOCH_3$ | $-CH_3$ | $-CH_3$ | XI | $-N(C_6H_5)_2$ | I |
| $D_{179}$ | XXXIII | $-C_8H_{12}$ | $-C_2H_5$ | $-C_2H_5$ | X | H | I |
| $D_{180}$ | XXXIII | $-C_7H_{15}$ | $-C_2H_5$ | $-C_2H_5$ | X | H | I |
| $D_{181}$ | XXXIV | $-C_{17}H_{34}COOCH_3$ | $-CH_3$ | $-CH_3$ | X | H | $ClO_4$ |
| $D_{182}$ | XXXIV | $-C_8H_{16}CH_2OCOCH_3$ | $-CH_3$ | $-CH_3$ | XI | $-N\smash{\bigcirc}N-COOC_2H_5$ | I |
| $D_{183}$ | XXXIV | $-C_{17}H_{35}$ | $-CH_3$ | $-CH_3$ | XII | $-N\smash{\bigcirc}N-COOC_2H_5$ | $ClO_4$ |
| $D_{184}$ | XXXIV | $-C_7H_{14}COOCH_3$ | $-C_2H_5$ | $-C_2H_5$ | X | H | $ClO_4$ |
| $D_{185}$ | XXXV | $-C_7H_{14}CH_2OH$ | $-CH_3$ | $-CH_3$ | X | H | $ClO_4$ |
| $D_{186}$ | XXXV | $-C_7H_{14}CH_2OCOC_2H_5$ | $-CH_3$ | $-CH_3$ | X | H | I |
| $D_{187}$ | XXXV | $-C_{17}H_{34}COOC_2H_5$ | $-CH_3$ | $-CH_3$ | XI | $-N(C_6H_5)_2$ | I |
| $D_{188}$ | XXXV | $-C_{17}H_{35}$ | $-CH_3$ | $-CH_3$ | XII | H | I |
| $D_{189}$ | XXXV | $-C_7H_{15}$ | $-C_2H_5$ | $-C_2H_5$ | X | H | I |
| $D_{190}$ | XXXVI | $-C_7H_{15}$ | $CH_3$ | $CH_3$ | X | H | I |
| $D_{191}$ | XXXVI | $-C_7H_5$ | $CH_3$ | $CH_3$ | X | H | $ClO_4$ |
| $D_{192}$ | XXXVI | $-C_{17}H_{35}$ | $CH_3$ | $CH_3$ | X | H | $ClO_4$ |
| $D_{193}$ | XXXVI | $-C_{17}H_{35}CH_2OCOCH_3$ | $CH_3$ | $CH_3$ | X | H | I |

These dyes can be easily synthesized in accordance with the methods described in the "Nitrogen-containing Heterocyclic Compounds I," page 432 of the "Great Organic Chemistry" (published by Asakura Shoten).

Any of these dyes may be used alone to form the entire recording layer.

Otherwise, such a dye may be used in combination with a resin to form the recording layer.

The resin may be advantageously of the autoxidizable type or the thermoplastic type.

The autoxidizable resin which is incorporated in the recording layer is intended to induce oxidative decomposition when it is heated to an elevated temperature. Among other autoxidizable resins, nitrocellulose proves to be particularly advantageous.

The thermoplastic resin, when incorporated in the recording layer, is intended to soften when, the dye is heated by the absorption of the recording beam. Any of various known thermoplastic resins can be used for this purpose.

Of the various thermoplastic polymers available, those which prove particularly advantageous are as already described above.

The autoxidizable resin and the thermoplastic resin to be used herein may have any molecular weight.

The autoxidizable or thermoplastic resin and the dye are generally incorporated in the recording layer in a weight ratio in the range of 1:0.1–100, preferably 1:5–20.

The recording layer is desired to contain additionally a quencher for singlet oxygen. The incorporation of the quencher effects notable abatement of the degradation of the medium by the action of the light of long wavelength. Examples of the quencher for singlet oxygen are as already described above.

The deposition of the recording layer described above on the substrate may be accomplished by spreading the dough prepared for the recording layer on the substrate by an ordinary method known to the art. The thickness of the recording layer is generally in the range of 0.03 to 2 μm. When the recording layer is formed solely of a dye, the deposition of the recording layer may be accomplished by vacuum evaporation, spattering, etc.

This invention also relates to an optical recording medium which has deposited on a substrate a recording layer incorporating therein a light absorbing dye represented by the general formula IV.

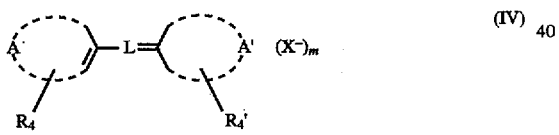
(IV)

wherein A and A' each denote a thiazole ring, an oxazole ring, a selenazole ring, an imidazole ring or a pyridine ring which may be condensed with an aromatic ring, $R_4$ and $R_4'$ each denote a substituted or unsubstituted alkyl group having not less than four carbon atoms, L denotes a combining group for formation of a mono-, di-, tri- or tetra-cyanine, $X^-$ denotes an anion, and m denotes 0 or 1. This recording layer may additionally incorporate therein a resin or a quencher for singlet oxygen or both.

In the foregoing general formula IV, A and A' each denote an atomic group necessary for the formation of a thiazole ring, an oxazole ring, a selenazole ring, an imidazole ring or a pyridine ring which may have an aromatic ring such as, for example, a benzene ring, a naphthalene ring, or a phenanthrene ring polycondensed thereto. A and A' may be the same or different. Preferably however, A and A' are the same.

Of all the rings possibly formed by A and A', the atomic groups of A and A' are selected from the groups represented by the following formulas XXXVII through LVII. In the following formulas, such atomic groups are collectively expressed in the form of rings formed by A.

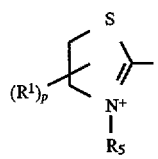
(XXXVII)

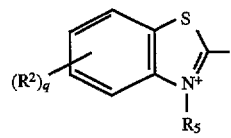
(XXXVIII)

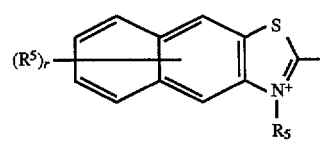
(XXXIX)

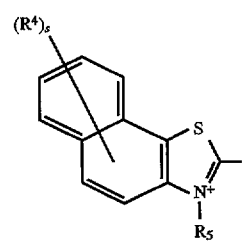
(L)

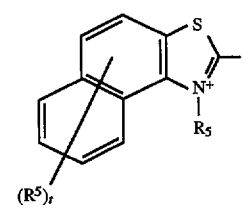
(LI)

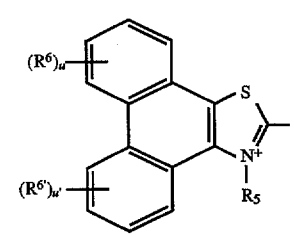
(LII)

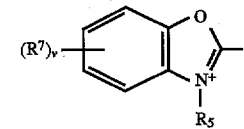
(LIII)

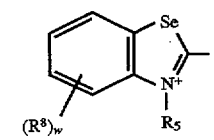
(LIV)

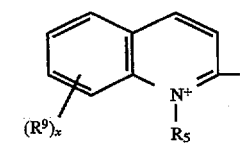
(LV)

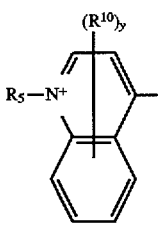

(LVI)

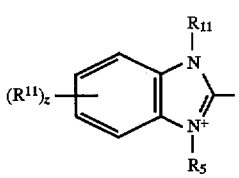

(LVII)

In the formulas given above, $R_5$ and $R_5'$ each denote a substituted or unsubstituted alkyl group or aryl group. In this case, the number of carbon atoms of the alkyl group must be not less than 4.

When the number of carbon atoms of $R_5$ and $R_5'$ are less than 4, the effect of this invention cannot be manifested. When the numbers of carbon atoms of $R_5$ and $R_5'$ are excessively large, the absorption coefficient is lowered and the instability is heightened. To avoid this trouble, therefore, the numbers of carbon atoms are desired to be in the range of 4 to 19. Better results are obtained when the numbers of carbon atoms are limited to the range of 5 to 18.

When $R_5$ and $R_5'$ are substituted alkyl groups, examples of the substituent which proves advantageous for the substitution involved herein include sulfonic acid group, alkylcarbonyloxy groups, alkylamide groups, alkylsulfonamide groups, alkoxyoxy groups, hydroxyl group, halogen atoms, alkylamino groups, alkylcarbamoyl groups and alkylsulfamoyl groups.

When the symbol m which will be described afterward is 0, $R_5$ possesses a minus (−) electron charge.

When the substituent involved in the substitution of $R_5$ contains a carbon atom, the total number of carbon atoms in the substituted alkyl group has only to equal the number mentioned above, but in this case carbonyl carbon is not contained.

Generally $R_5$ and $R_5'$ are bonded to the nitrogen atoms in the rings of A and A'.

Then, $R_{11}$ denotes a substituted or unsubstituted alkyl group similarly to $R_5$ and $R_5'$. The number of carbon atoms of $R_2$ is not specifically limited.

$R^1, R^2, R^3, R^4, R^5, R^6, R^{6'}, R^7, R^8, R^9, R^{10}$ and $R^{11}$, each denote a substituent, which is desired to be an alkyl group, an aryl group, a heterocyclic group, a halogen atom, an alkoxy group, an alkylthio group, an alkylhydroxycarbonyl group or a carboxylic acid group. Then p, q, r, s, t, u, u', v, w, x, y and z each denote an integer of 0 or at least 1. Generally, the value of this integer is 0 or 1 to 4.

L denotes a combining group for formation of a mono-, di-, tri- or tetra-cyanine dye. This combining group is desired to be any of the groups represented by the aforementioned formulas X through XXI. $X^-$ and m have the same meanings as mentioned above.

Now, concrete examples of the light absorbing dye advantageously useful for this invention will be shown in Table 5 below. It should be noted, however, that they are not the only light absorbing dyes which can be utilized in the present invention.

TABLE 5

| Dye No. | A, A' | $R_5, R_{11}$ | $R^1$–$R^{10}$ | L | Y | X |
|---|---|---|---|---|---|---|
| $D_{194}$ | XXXVIII | —$C_8H_{17}$ | 4-$CH_3$ | X | H | I |
| $D_{195}$ | XXXVIII | —$C_{18}H_{37}$ | — | X | H | I |
| $D_{196}$ | XXXVIII | —$C_8H_{17}$ | — | X | H | $ClO_4$ |
| $D_{197}$ | XXXVIII | —$C_8H_{17}$ | 5-Cl | X | H | $ClO_4$ |
| $D_{198}$ | XXXVIII | —$C_{18}H_{37}$ | 5-Cl | X | H | I |
| $D_{199}$ | XXXVIII | —$C_8H_{17}$ | 5-O $CH_3$, 6-O $CH_3$ | X | H | I |
| $D_{200}$ | XXXVIII | —$C_8H_{17}$ | 5-O $CH_3$ | XII | — | I |
| $D_{201}$ | XXXVIII | —$C_8H_{17}$ | 5-Cl | X | —$N(C_6H_5)_2$ | I |
| $D_{202}$ | XXXVIII | —$C_{18}H_{37}$ | 5-Cl | XIX | —$N(C_6H_5)_2$ | $ClO_4$ |
| $D_{203}$ | XXXVIII | —$C_8H_{17}$ | — | X | —N⟨ ⟩—$COOC_2H_5$ | I |
| $D_{204}$ | XXXVIII | —$C_8H_{17}$ | — | XIII | H | I |
| $D_{205}$ | XXXVIII | —$C_8H_{17}$ | — | XV | H | I |
| $D_{206}$ | XXXVIII | —$C_8H_{17}$ | — | XVI | — | I |
| $D_{207}$ | XXXIX | —$CH_{17}$ | — | XI | $N(C_6H_5)_2$ | $ClO_4$ |
| $D_{208}$ | XXXIX | —$C_{15}H_{37}$ | — | X | H | $ClO_4$ |
| $D_{209}$ | XXXIX | —$C_{13}H_{27}$ | — | X | H | $ClO_4$ |
| $D_{210}$ | XXXIX | —$C_{13}H_{27}$ | — | X | H | I |
| $D_{211}$ | XXXIX | —$C_8H_{17}$ | — | XI | N⟨ ⟩$COOC_2H_5$ | $ClO_4$ |
| $D_{212}$ | LI | —$C_8H_{17}$ | — | XI | $OCH_3$ | I |
| $D_{213}$ | LI | —$C_{18}H_{37}$ | — | X | H | I |
| $D_{214}$ | XXXVIII | —$C_8H_{17}$ | — | X | H | $ClO_4$ |

TABLE 5-continued

| Dye No. | A, A' | R$_5$, R$_{11}$ | R$^1$–R$^{10}$ | L | Y | X |
|---|---|---|---|---|---|---|
| D$_{215}$ | LIV | —C$_8$H$_{17}$ | — | X | H | I |
| D$_{216}$ | LIV | —C$_5$H$_{17}$ | — | X | 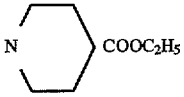 | ClO$_4$ |
| D$_{217}$ | LIV | —C$_{13}$H$_{27}$ | 5-Cl | X | H | I |
| D$_{218}$ | LIV | —C$_8$H$_{17}$ | — | X | N(C$_6$H$_5$)$_2$ | ClO$_4$ |
| D$_{219}$ | LIV | —C$_8$H$_{37}$ | — | XI | N(C$_6$H$_5$)$_2$ | I |
| D$_{220}$ | LVI | —C$_6$H$_{17}$ | — | X | H | ClO$_4$ |
| D$_{221}$ | LVII | —C$_8$H$_{17}$ | — | X | H | ClO$_4$ |
| D$_{222}$ | XXXVII | —C$_8$H$_{17}$ | — | X | H | ClO$_4$ |
| D$_{223}$ | L | —C$_8$H$_{17}$ | — | X | H | ClO$_4$ |
| D$_{224}$ | LV | —C$_8$H$_{17}$ | — | X | H | ClO$_4$ |

These dyes can be easily synthesized in accordance with the methods described in the "Nitrogen-containing Heterocyclic Compounds 1," page 432 of The "Great Organic Chemistry" (published by Asakura Shoten) as already described above.

To be specific, such a dye is obtained by first heating a corresponding

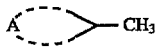

(wherein A has the same meaning as described above) in combination with an excess of R$_1$I (wherein R$_1$ has the same meaning as described above) thereby affording

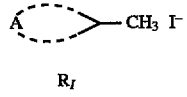

and subsequently subjecting this product to dehydration polycondensation by the use of an unsaturated dialdehyde or an unsaturated oxyaldehyde and an alkali catalyst.

This dye may be used alone to form the entire recording layer.

Otherwise, the dye may be used in combination with a resin to form the recording layer.

The resin so used with this dye to form the recording layer advantageously may be of the autoxidizable type or of the thermoplastic type.

The autoxidizable resin incorporated in the recording layer is intended to undergo oxidative decomposition when the layer is heated to an elevated temperature. Among other autoxidizable resins available for this purpose, nitrocellulose proves to be particularly desirable.

The thermoplastic resin incorporated in the recording layer is intended to be softened when the coloring matter in the recording layer is heated to an elevated temperature by the absorption of the recording beam. Any of various thermoplastic resins known to the art may be used herein.

Of all the thermoplastic resins available, those which prove particularly advantageous are as already described above.

The molecular weights and others properties of the autoxidizable resin and the thermoplastic resin to be used may be varied to suit the occasion.

Generally, for incorporation into the recording layer, the autoxidizable resin or thermoplastic resin and the aforementioned coloring matter are used in a weight ratio falling in a wide range of 1:0.1–100, preferably 1:5–20.

The recording layer is desired to include a quencher for singlet oxygen.

The quencher thus incorporated serves to abate the degradation of the optical recording medium by the action of the beam of long wavelength and the degradation of reading signal. Examples of the quencher for singlet oxygen are as already described above.

The quencher for singlet oxygen is generally incorporated in the recording layer in an amount of 0.05 to 12 moles, preferably 0.1 to 1.2 moles, per mole of the aforementioned dye.

Deposition of such a recording layer as described above on the substrate may be accomplished generally by causing the dough prepared for the recording layer to be spread on the substrate by methods known to the art. The thickness of the recording layer generally is in the range of about 0.03 to 2 μm. Where the recording layer is solely formed of a dye, the deposition of the recording layer may be effected by vacuum evaporation, spattering, etc.

The various objects described above are also attained by this invention providing an optical recording medium which has deposited on a substrate a recording layer containing a light absorbing dye represented by the general formula IIa:

$$\phi''-L=\psi''(X^-)_m \qquad (IIa)$$

wherein φ" and ψ" each denote a thiazole ring, an oxazole ring, a selenazole ring, an imidazole ring or a pyridine ring which may be condensed with an aromatic ring, but a nitrogen atom in the φ" and ψ" is not substituted or is substituted with an alkyl group having 4 and more carbon atoms; and φ" and ψ" be same or different, usually the same, and these rings may be contain various substituents. Further, a nitrogen atom in the ring of φ" has a positive (+) charge, and a nitrogen atom in the rings of ψ" is neutral. Skeleton ring of these φ" and ψ" are preferably ones shown in the above mentioned formulas XXII to XXXII.

In each such each ring, group R$_5$ (R$_5$, R$_{11}$) binding the nitrogen atom (there are two nitrogen atoms in imidazole ring) in the ring, is a substituted or unsubstituted alkyl or aryl group, but when R$_5$ and R$_{11}$ are substituted or unsubstituted alkyl the number of carbon atoms is not more than 4.

Further, when R$_5$ and R$_{11}$ are substituted, typical group substituents are the sulfonic acid group, alkyl carbonyloxy group, alkylamide group, alkyl sulfonamide group, alkoxyoxy group, alkylamino group, alkylcarbamoyl group, alkyl sulfamoyl group, hydroxy group, halogen atoms and the like.

Further, when the below mentioned m is zero, $R_5$ binding nitrogen atom in $\phi''$ is substituted alkyl or aryl and has a minus (−) charge.

Other substituents, $R^1$ to $R^{11}$, may be bound at the desired position in the ring shown by $\phi''$ and $\psi''$. Typical group substituents may be the alkyl group, aryl group, heterocyclic residue, halogen atoms, alkoxy group, alkylthio group, alkyloxycarbonyl group, alkyl carbonyloxy group, carboxylic acid group and the like. The number of the substituents (p, q, r, s, t, u, v, w, x, y and z) is usually 0 or an integer from 1 to 4. When p, q, r, s, t, u, v, w, x and z are at least two, $R^1$ to $R^{10}$ may be different from each other.

L denotes a combining group for formation of a mono-, di-, tri- or tetra-cyanine, especially preferable ones being shown by formulas X to XXI. Among these formulas X to XXI, X, XI, XII, and XVIII are most preferable. Further, $X^-$ and m are as mentioned above.

The following table shows typical examples of the light-absorbing dye of the present invention.

The dye used in the recording layer is not specifically limited. Examples of the dye usable for this purpose include dyes of cyanine type, phthalocyanine type, naphthalocyanine type, choline or cholol type, anthraquinone type, azo type, triphenylmethane type, pyrylium or thiapyrylium salt type.

Of all these dyes, those of cyanine type enable the effect of this invention to be manifested most conspicuously.

In the dyes of the cyanine type, those represented by the aforementioned general formula Ia are particularly desirable. Concrete examples of these cyanine dyes are as already shown in Tables 1 to 4. It should be noted, however, that these are not the only dyes with which can be used in the present invention.

Such a dye as described above may be used alone to form the entire recording layer.

Otherwise, the dye may be used in combination with a resin to form the recording layer.

The resin thus used in combination with the dye to form the recording layer is desired to be of the autoxidizable type or the thermoplastic type.

TABLE 6

| Dye No. | φ, ψ | $R_5$, $R_{11}$ | $R_6$, $R_7$ | R'-R" | L | Y | X |
|---------|------|-----------------|--------------|-------|---|---|---|
| $D_{225}$ | XXIII | $C_2H_5$ | — | — | X | H | $ClO_4$ |
| $D_{226}$ | XXIII | $C_2H_5$ | 5-Cl | — | XI | $N(C_6H_5)$ | $ClO_4$ |
| $D_{227}$ | XXIII | $C_2H_5$ | 5-O $CH_3$ | — | X | H | I |
| $D_{228}$ | XXIII | $C_2H_5$ | ( 5-O $CH_3$, 6-O $CH_3$ ) | — | X | H | I |
| $D_{229}$ | XXIII | $C_2H_5$ | — | — | XII | — | I |
| $D_{230}$ | XXIII | $C_2H_5$ | — | — | X | H | I |
| $D_{231}$ | XXIII | $C_2H_5$ | — | — | XIV | H | $ClO_4$ |
| $D_{232}$ | XXIII | $C_2H_5$ | — | — | X | $CH_3$ | I |
| $D_{233}$ | XXIII | $C_2H_5$ | — | — | XIII | H | I |
| $D_{234}$ | XXIII | $C_2H_5$ | — | — | XIII | H | I |
| $D_{235}$ | XXIII | $C_2H_5$ | — | — | XV | — | I |
| $D_{236}$ | XXIV | $(CH_2)_2OCOCH_3$ | — | — | XI | $N(C_6H_5)_2$ | $ClO_4$ |
| $D_{237}$ | XXIII | $CH_2CH_2OH$ | 5-Cl | — | X | H | $ClO_4$ |
| $D_{238}$ | XXV | $C_2H_5$ | — | — | X | H | $ClO_4$ |
| $D_{239}$ | XXVI | $C_2H_5$ | — | — | X | H | I |
| $D_{240}$ | XXVI | $C_2H_5$ | — | — | XI | 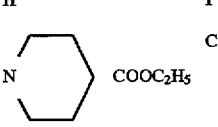 | $ClO_4$ |
| $D_{241}$ | XXVI | $C_2H_5$ | — | — | XI | $OCH_3$ | I |
| $D_{242}$ | XXVII | $C_2H_5$ | — | — | X | H | I |
| $D_{243}$ | XXVIII | $CH_2CH_2OH$ | — | — | X | H | $ClO_4$ |
| $D_{244}$ | XXVIII | $C_2H_5$ | — | — | X | H | I |
| $D_{245}$ | XXVIII | $(CH_2)_3OCOCH_3$ | — | — | X | 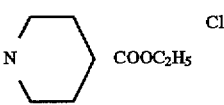 | $ClO_4$ |
| $D_{246}$ | XXIX | $C_2H_5$ | — | — | X | H | I |
| $D_{247}$ | XXIX | $CH_2CH_2CH_2SO_3H$ | — | — | XI | $N(C_6H_5)_2$ | $ClO_4$ |
| $D_{248}$ | XXIX | $C_2H_5$ | — | — | XI | $N(C_6H_5)_2$ | I |
| $D_{249}$ | XXX | $C_2H_5$ | — | — | X | H | $ClO_4$ |
| $D_{250}$ | XXX | $C_2H_5$ | — | — | X | H | $ClO_4$ |

This invention also relates to an optical recording medium which is formed by placing on a resin substrate an underlying layer selected from the group consisting of titanium oxide film and films of hydrolyzates of Zr and Al chelate compounds and superposing on this underlying layer a recording layer of a dye or a dye composition.

The recording layer thus formed in the optical recording medium of this invention contains a dye.

The autoxidizable resin which is incorporated in the recording layer is intended to undergo oxidative decomposition when the recording layer is heated to an elevated temperature. Of all the autoxidizable resins available, nitrocellulose is particularly desirable.

The thermoplastic resin incorporated in the recording layer is intended to be softened when the dye is heated to an elevated temperature by absorbing the recording beam. Any of various thermoplastic resins known to the art can be used for the purpose.

Of the various thermoplastic resins usable, those which prove to be particularly desirable are as already described above.

The molecular weight and other properties of the autoxidizable resin or the thermoplastic resin may be varied to suit the occasion.

The autoxidizable resin or thermoplastic resin described above and the aforementioned dye are generally incorporated in the recording layer at a weight ratio in the wide range of 1:0.1–100, preferably 1:5–20.

The recording layer to be formed as described above may additionally include a quencher.

This quencher serves to abate the degradation of reproduction and enhance the resistance to light.

Any of various types of quenchers can be used for the present invention, particularly a quencher for singlet oxygen which, when the dye is excited by light to liberate singlet oxygen, relieves this singlet oxygen of the burden of electron transfer or energy transfer and consequently assumes an excited state and reverts itself to its basic state and, at the same time, converts the singlet oxygen into a triplet state. Examples of the singlet oxygen quencher are as already described above.

The quencher is incorporated in the recording layer in an amount in the range of about 0.05 to 12 moles, preferably 0.1 to 1.2 moles, per mole of the aforementioned dye.

The quencher is desired to have a maximum absorption wavelength not less than 50 nm greater than the maximum absorption wavelength of the dye used in the recording layer.

When the maximum absorption wavelength of the quencher is at least 50 nm greater than the maximum absorption wavelength of the dye, the excitation of the singlet oxygen quencher under room light, etc. is negligibly small, the oxidative degradation of the dye due to otherwise possible loss of the quenching effect is abated, and the preservability of the optical recording medium under ambient light is notably enhanced.

To permit side reduction of the whole device, it is desirable to use as the source for writing or reading beam a laser diode rated for 750, 780 or 830 nm and a He—Ne laser rated for 633 nm. In this connection, the maximum absorption wavelength of the singlet oxygen quencher is desired to be not less than 680 nm, desirably to be from 680 to 1500 nm, and preferably to be from 800 to 1500 nm.

The relation between the absorption coefficient of the dye (the actual available value where two or more dyes are used) and that of the singlet oxygen quencher under the wavelength of the reading beam is desired to be such that the ratio of $\epsilon_D/\epsilon_Q$ will be not less than 3 where $\epsilon_D$ denotes the former absorption coefficient and $\epsilon_Q$ the latter absorption coefficient respectively.

Where two or more dyes are used, the maximum absorption wavelength $\epsilon_D$ of the dyes represents the actual value of additive average to be determined based on the concentration of the individual dyes.

Deposition of this recording layer on the substrate is accomplished as already described above. The substrate on which the recording layer is superposed is made of any of a variety of resins.

Of the various resins available the preferred are, those which are readily acted upon by the solvent used during the deposition of the recording layer on the substrate such as, for example, a ketone type solvent, an ester type solvent, or a halogenated alkyl type solvent, and which permit the effect of the underlying layer of this invention to be conspicuously manifested are resins of the acrylic type or of the polycarbonate type. When the substrate is made of an acrylic type resin or polycarbonate type resin, since the resin is substantially transparent to the writing beam and the reading beam, the writing and reading of information on the optical recording medium can be carried out from the rear side of the substrate. Thus, the optical recording medium is advantageous in terms of sensitivity and S/N ratio. It is also advantageous in terms of the actual fabrication which demands payment of due attention to the protection against dust. Since the resin enjoys good moldability, it permits ready formation of a tracking groove on the recording layer.

Examples of acrylic resin advantageously used herein include polymethyl methacrylates and copolymers and homopolymers formed preponderantly of methacrylic esters having alkyl group of one to seven carbon atoms.

The polycarbonate resin is desired to be of bis-phenol-A-type.

When the acrylic resin or polycarbonate resin is a product obtained by the injection molding method, the effect of the underlying layer of this invention is manifested conspicuously.

The number-averaged polymerization degree of the acrylic resin or polycarbonate resin is from about 800 to 6,000.

The substrate may be in the shape of disc, card, tape, drum or belt to suit the particular purpose for which the substrate is intended. The substrate is desired to have a tracking groove formed in advance on the recording layer side surface thereof.

On the surface of such a substrate as described above, an underlying layer of titanium dioxide is formed. On this underlying layer is superposed the recording layer.

The underlying layer of titanium dioxide is desired to be a film of the hydrolyzate of an organic titanate compound.

Any of the organic titanate compounds known to the art can be used. Examples of the organic titanate compound advantageously used herein include alkyl titanic esters, substituted alkyl titanic esters, alkenyl titanic esters, and substituted titanic esters.

Of these organic titanates, those which prove to be particularly advantageous are the organic titanates represented by the following structural formula.

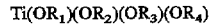

$$Ti(OR_1)(OR_2)(OR_3)(OR_4)$$

wherein $R_1$, $R_2$, $R_3$ and $R_4$ each denote hydrogen atom or a substituted or unsubstituted alkyl group or alkenyl group. It is provided, however, that at least two of the four substituents, $R_1$ through $R_4$, are desired each to be an alkyl or alkenyl groups and not a hydrogen atom.

The number of carbon atoms in each of the substituted or unsubstituted alkyl or alkenyl groups is desired to be in the range of 2 to 18.

In the case of a substituted alkyl or alkenyl group, the substituent involved is desired to be a carboxyl group, an alkylcarboxyl group, a substituted amino group such as di(hydroxyalkyl)amino group, a hydroxyl group, or an alkyloxycarbonyl group.

Now, concrete examples of the organic titanate will be shown below. It should be noted, however, that these are not the only organic titanates which the can be employed in present invention.

T1—Tetraethyl titanate
T2—Tetrapropyl titanate
T3—Tetraisopropyl titanate
T4—Tetra (n-butyl) titanate T5—Tetra(isobutyl) titanate
T6—Tetra(sec.-butyl) titanate
T7—Tetra (tert.-butyl) titanate
T8—Tetra (2-ethylhexyl) titanate
T9—Tetrastearyl titanate
T10—Hydroxy titanium stearate
T11—Isopropoxy titanium stearate
T12—Hydroxy titanium oleate
T13—Isopropoxy titanium oleate
T14—Di-i-propoxy-bis (acetylacetone) titanate
T15—Di-n-butoxy-bis (triethanolamine) titanate
T16—Dihydroxy-bis(lactic acid) titanate
T17—Tetraoctylene glycol titanate
T18—Di-i-propoxy-bis(ethyl acetacetate) titanate Among the above mentioned titanates, the chelate titanate compounds having two alkoxide groups are preferred.

Such an organic titanate may be used in the form of an oligomer.

Formation of the underlying layer by the use of such an organic titanate may be accomplished by taking up the organic titanate a solvent such as water, alcohol, hexane, or benzene or a mixture thereof, applying the diluted organic titanate to the substrate, and allowing the applied layer of organic titanate spontaneously to undergo hydrolysis. Consequently, there is formed an underlying layer consisting substantially completely of titanium oxide.

Otherwise on the surface of the substrate, there may be superposed an underlying layer formed of a film of the hydrolyzate of a Zr chelate compound or Al chelate compound. On this underlying layer is superposed the recording layer.

In this case, although the film of the hydrolyzate may be derived from an Al chelate compound, it is preferred to be derived from a Zr chelate compound.

The Zr chelate compound to be used for the production of the film of its hydrolyzate may be any of the various Zr chelate compounds known to the art. Preferably it is selected from among organic zirconium compounds.

Examples of the organic Zr chelate compounds advantageously used herein include alkyl zirconic esters, substituted alkyl zirconic esters, alkenyl zirconic esters, and substituted alkenyl zirconic esters.

Of all the organic compounds, those which have the following structural formula prove particularly desirable:

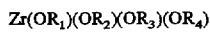

$Zr(OR_1)(OR_2)(OR_3)(OR_4)$ wherein $R_1$, $R_2$, $R_3$, and $R_4$ each denote a hydrogen atom or a substituted or unsubstituted alkyl or alkenyl group. It is provided, however, that at least two of the four substituents, $R_1$ through $R_4$, are alkyl or alkenyl groups and not a hydrogen atom.

The number of carbon atoms of the substituted or unsubstituted alkyl or alkenyl group is from 2 to 18.

Examples of the group substituent advantageous for the substitution of the alkyl or alkenyl group include carboxyl groups, alkylcarboxy groups, substituted amino groups such as di(hydroxyalkyl)-amino groups, hydroxyl groups, an alkyloxycarbonyl groups.

Such an organic zirconate compound may be in the form of an oligomer.

Formation of an underlying layer by the use of such a Zr or Al chelate compound as described above is accomplished by taking up the Zr or Al chelate compound in a solvent such as water, alcohol, hexane, or benzene or a mixture thereof, applying the diluted chelate compound to the substrate, and allowing the applied layer of the diluted chelate compound to be spontaneously hydrolyzed. Consequently, there is formed an underlying layer consisting substantially completely of zirconium oxide or aluminum oxide or a hydrate thereof.

The thickness of this underlying layer is in the range of about 0.001 to 0.1 µm.

On the underlying layer thus formed, the recording layer is generally superposed directly. When necessary, however, an intermediate layer may be interposed between the underlying layer and the recording layer.

Optionally, on the recording layer, there may be superposed a reflection layer which functions as a rear face when the substrate is transparent, an uppermost protection layer, or a half-mirror layer.

The optical recording medium of this invention may have the aforementioned recording layer deposited on one side of the substrate, with an underlying layer interposed therebetween. Otherwise, it may have two such recording layers deposited one each on opposite sides of the substrate, with two underlying layers similarly interposed one each therebetween. Optionally, two sets each having a recording layer superposed on an underlying layer formed on one side of a substrate may be prepared, disposed parallel to each other so that their respective recording layers will be opposed to each other across a prescribed space, and then enclosed tightly in situ within a container so as to be protected against dust and scratches.

The optical recording medium of the present invention is moved or rotated under the stationary source of recording beam so that it will be irradiated with the recording beam in a pulsated pattern. As the recording beam causes the dye in the recording layer to evolve heat, the autoxidizable compound is decomposed or the thermoplastic resin and the dye are melted, with the result that pits are formed in the recording layer.

In this case, particularly when there is used a tri- or tetra-carbocyanine dye, highly desirable writing of information in the recording layer is accomplished by using as the source for recording beam a laser diode or photo diode having a wavelength of 750, 780 or 830 nm. The pits thus formed in the recording layer can be read out by causing the optical recording medium to be moved or rotated under the reading beam of the same wavelength as mentioned above and detecting the reflected beam or the penetration beam, preferably the reflected beam, originating in the reading beam.

In case where the recording layer contains a thermoplastic resin, the pits once formed in the recording layer may be erased with light or heat so that the recording layer will be readied for reuse.

As the source for the recording or reading beam, there may be used a He—Ne laser.

Where the optical recording medium is produced by forming an underlying layer on a substrate of transparent resin and superposing a recording layer on the underlying layer, the writing of information in the recording layer is desired to be performed from the rear side of the substrate. Further in this case, the reading beam is desired to be projected to the medium from the rear side of the substrate, so that the reading of the pits will be effected by detecting the reflection of the reading beam.

In accordance with this invention, writing of information can be effected with extremely high sensitivity and reading of the information with very high S/N ratio.

In this case, the preservability of the optical recording medium in its original state and the preservability of the recorded information are both very high.

Further, the recording layer forms pits of highly desirable shape and these pits in this recording layer show very high reflectance as compared with the pits formed in the recording layer using other tri- or tetra-carbocyanine or Ni or Pt dithiol complex as the dye. Thus, the C/N ratio of the read signal obtained with the recording layer is extremely high.

When the recording layer contains a singlet oxygen quencher, the singlet oxygen which is produced by the energy transfer arising from the cyanine dye in its excited state is effectively converted by this quencher into its triplet state even when the optical recording medium is retained in the presence of infrared light. Thus, the degradation of the cyanine dye in the recording layer is notably adapted and, consequently, the preservability of the optical recording medium in its original state and the preservability of the recording information are notably enhanced.

By the same token, the degradation of reading signal by the reading beam is notably diminished.

Further, optical recording medium enjoys high stability to resist heat and avantageous preservability in its original state and read only sparingly low degradation of writing characteristics.

No degradation of such characteristics occur even when the information once written in the recording layer is erased and replaced with newly written information.

When the underlying layer contemplated by this information is interposed between the substrate and the recording layer, the degradation of the substrate of resin by the action of the solvent used in the deposition of the recording layer to the substrate is notably abated and, consequently, the S/N ratio of the read signal is conspicuously improved. The gradual decline of the reflectance by aging during prolonged preservation of the optical recording medium is curbed by this underlying layer.

Now, the present invention will be described more specifically below with reference to working examples.

EXAMPLE 1

One part by weight of the dye, No. D10, mentioned above was dissolved in 80 parts by weight of cyclohexanone-dichloroethane (1:1). The resultant solution was applied in a thickness of 0.4 μm to a disc substrate of poly (methyl methacrylate )prepared by casting 15 cm in diameter to obtain a medium of this invention.

Separately, a comparative medium was prepared by repeating the procedure, except a dye A indicated below was used instead.

The two media thus prepared were rotated at a rate of 1800 rpm. On each of the media thus kept in rotation, a recording beam of AlGaAs-GaAs laser diode (830 nm) was projected in a concentrated spot 1 μm in diameter (output at the concentrated spot 10 mW) to irradiate the recording layer at a fixed frequency in the pattern of a train of pulses.

The two media were irradiated with the writing beam whose pulse width was gradually changed, to determine the particular pulse width at which the quenching ratio 2.5 is obtained. The reciprocal of this particular pulse width was reported as the writing sensitivity. The results were as shown in Table 7.

In this case, the quenching ratio represented the degree of attenuation, in the pits, of the reflectance of the reading beam on the surface of the medium which will be described afterward.

Separately, reading of information was carried out with the pulse width fixed at 100 n.sec.

Thereafter, a reading beam of laser diode of 1 mW (830 nm) was projected in the pattern of pulses of 3 KHz having a width of 1 μ.sec., to measure the peak-to-peak S/N ratio on the disc surface in the initial stage of the projection and five minutes after the start of the projection.

The results were as shown in Table 7.

EXAMPLE 2

In a mixed solvent consisting of 1 part of dichloroethane and 1 part of cyclohexanone, the aforementioned dye, No. D10, and nitrocellulose having a nitrogen content in the range of 11.5 to 12.2% and viscosity of 20 seconds as measured in accordance with the method of JIS K6703 were dissolved in a weight ratio of 3:1.

The resultant solution was spread in a thickness of 0.5 μm on a disc substrate of poly(methyl methacrylate) prepared by casting 15 cm in diameter to afford a medium of the present invention. This medium was subjected to the same measurement as in Example 1. The results were as shown in Table 7.

In this table, the data on the reflectance at 830 nm are also indicated.

TABLE 7

| Medium | Example 1 | Example 2 | Control 1 |
| --- | --- | --- | --- |
| Dye | D10 | D10 | A |
| Sensitivity (n.sec$^{-1}$) | $1 \times 10^{-2}$ min. | $1 \times 10^{-2}$ min. | $1 \times 10^{-2}$ min. |
| S/N ratio (dB) | 53 | 53 | 40 |
| Degradation of reading signal, S/N ratio (dB) | 53 | 53 | 40 |
| Surface reflectance (%) | 41 | — | 9 |

It is noted from the results given in Table 7 that the media of the present invention have high writing sensitivity and very high S/N ratio of reading signal, and manifest a very low degradation of reading signal.

EXAMPLE 3

The procedure of Example 1 was followed, except that the dye used in Example 1 was substituted by one of the dyes identified in Table 8, to measure sensitivity, S/N ratio, and degradation of reading signal.

A

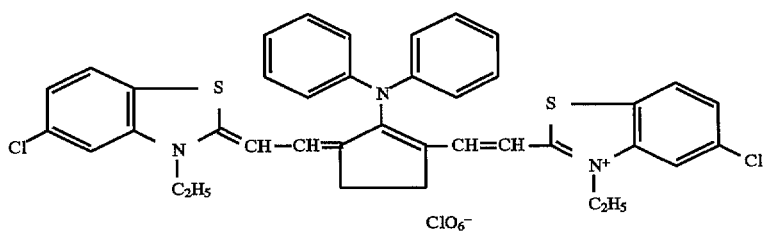

The results were as shown in Table 8.

Table 8 also shows the wavelengths of laser diodes used as the sources for writing and reading beams. In Table 8, the abbreviations "Coat" and "Evap" are used to indicate that relevant recording layers were formed by spreading and vacuum evaporation respectively. The recording layers were formed invariably in a fixed thickness of 0.1 μm.

The dyes, B through D, which were used in the preparation of media for control had the following structural formulas.

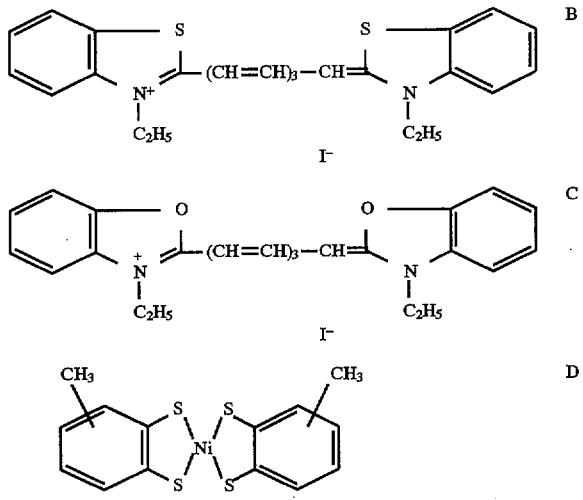

EXAMPLE 4

The procedure of Example 2 was repeated, except the dye of Example 2 was substituted by a one of the dyes identified in Table 9, to measure sensitivity, S/N ratio, and degradation of reading signal.

The results were as shown in Table 9.

Table 9 shows the wavelengths of laser diode used as the sources for writing and reading beams.

In this example, the thickness of the recording layer was fixed at 0.5 μm and the ratio of dye to nitrocellulose was fixed at 3:1.

The dyes B through D which were used in the preparation of media for control had the structural formulas as already described above.

EXAMPLE 5

The procedure of Example 2 was repeated, except that the dye of Example 2 was substituted by one of the dyes identified in Table 10, the nitrocellulose of Example 2 was substituted by cumarone-indene resin (referred to as CI for short; a product of Nittetsu Chemical Co., Ltd. having a number-average molecular weight of 730 and marketed under trademark designation of V-120), 6,6 nylon (referred to as NYL for short; having a number-averaged molecular weight of 30,000), and ethylene-vinyl acetate copolymer (referred to as EVA for short; having a number-averaged molecular weight of 30,000), and the thickness of recording layer changed to 0.6 μm. Consequently, there were media similar to those of Example 2.

Under the same conditions as involved in Example 2, the media were tested for recording and reading performance, to measure sensitivity, S/N ratio, and degradation of reading signal. The results were as shown in Table 10.

EXAMPLE 6

Information was written in the media obtained in Example 2. The entire surfaces of the media containing information pits were irradiated with the heat from an infrared ray heater at 100° C. for 20 seconds to erase the pits. The media were then subjected to writing of information once again.

The sensitivity of the writing of information and the S/N ratio on the second occasion were equal to those obtained on the first occasion.

TABLE 8

| Dye No. | Weave length of laser (nm) | Method for formation of recording layer | Sensitivity (n sec)$^{-1}$ | S/N ratio (dB) | S/N ratio (dB) after degradation of reading signal | Reflectivity (%) |
|---|---|---|---|---|---|---|
| EXAMPLE | | | | | | |
| D6 | 830 | | $8 \times 10^{-3}$ | 51 | 50 | 38 |
|    | 830 | | $5 \times 10^{-3}$ | 51 | 50 | 37 |
| D1 | 780 | Evap | $8 \times 10^{-3}$ | 52 | 50 | 39 |
|    | 750 | | $1 \times 10^{-2}$ min. | 53 | 51 | 40 |
| D10 | 830 | Coat | $1 \times 10^{-2}$ min. | 53 | 53 | 41 |
| D7 | 780 | Evap | $8 \times 10^{-3}$ | 52 | 52 | 41 |
| D11 | 830 | Coat | $1 \times 10^{-2}$ min. | 53 | 53 | 43 |
| CONTROL 2 | | | | | | |
| A | 830 | | $8 \times 10^{-3}$ | 41 | 40 | 9 |
| B | 780 | | $1 \times 10^{-2}$ min. | 41 | 40 | 10 |
| B | 830 | Evap | $8 \times 10^{-3}$ | 41 | 40 | 9 |
| C | 780 | | $2 \times 10^{-3}$ | 36 | 35 | 7 |
| D | 830 | | $2 \times 10^{-3}$ | 36 | 36 | 6 |

TABLE 9

| Dye No. | Weave length of laser (nm) | Sensitivity (n sec)⁻¹ | S/N ratio (dB) | S/N ratio (dB) after degradation of reading signal | Reflectivity (%) |
|---|---|---|---|---|---|
| Example 4 | | | | | |
| D6 | 830 | $1 \times 10^{-2}$ | 49 | 49 | 29 |
| | 830 | $8 \times 10^{-3}$ | 49 | 49 | 28 |
| D1 } | 780 | $1 \times 10^{-2}$ min. | 50 | 50 | 29 |
| | 750 | $1 \times 10^{-2}$ min. | 51 | 51 | 30 |
| D10 | 830 | $1 \times 10^{-2}$ min. | 51 | 51 | 31 |
| D7 | 780 | $1 \times 10^{-2}$ | 51 | 51 | 31 |
| D11 | 830 | $1 \times 10^{-2}$ min. | 50 | 50 | 33 |
| CONTROL 3 | | | | | |
| A | 830 | $1 \times 10^{-2}$ | 40 | 40 | 7 |
| B | 780 | $1 \times 10^{-2}$ min. | 40 | 40 | 8 |
| B | 830 | $1 \times 10^{-2}$ | 40 | 40 | 7 |
| C | 780 | $2 \times 10^{-3}$ | 35 | 35 | 6 |
| D | 830 | $2 \times 10^{-3}$ | 35 | 35 | 5 |

TABLE 10

| Dye No. | Resin | Weave length of laser (nm) | Sensitivity (n sec⁻¹) | S/N ratio (dB) | S/N ratio (dB) after degradation of reading signal | Reflectivity (%) |
|---|---|---|---|---|---|---|
| Example 5 | | | | | | |
| D6 | CI | 830 | $1 \times 10^{-2}$ min. | 51 | 50 | 29 |
| D6 | NYL | 830 | $8 \times 10^{-3}$ | 50 | 50 | 29 |
| D6 | EVA | 830 | $8 \times 10^{-3}$ | 50 | 50 | 29 |
| D2 | CI | 780 | $1 \times 10^{-2}$ | 52 | 51 | 29 |
| D2 | CI | 750 | $1 \times 10^{-2}$ min. | 52 | 51 | 30 |
| CONTROL 4 | | | | | | |
| A | CI | 830 | $8 \times 10^{-3}$ | 40 | 40 | 8 |
| B | CI | 830 | $8 \times 10^{-3}$ | 40 | 40 | 7 |
| C | CI | 830 | $2 \times 10^{-3}$ | 35 | 35 | 6 |
| D | CI | 830 | $2 \times 10^{-3}$ | 35 | 35 | 5 |

EXAMPLE 7

A varying dye (D), a varying resin (R), and a varying singlet oxygen quencher (Q) indicated in Table 11 below were dissolved in a varying proportion in a prescribed solvent. The resultant solution was spread in a thickness of 0.2 μm on a disc substrate of poly(methyl methacrylate) prepared by casting 15 cm in diameter, to produce a recording medium.

In Table 11, NC denotes nitrocellulose having a nitrogen content in the range of 11.5 to 12.2% and viscosity of 20 seconds as measured by the method of JIS K6703.

In the same table, CI denotes cumarone-indene resin (product of Nittetsu Cehmical Co., Ltd. having a number-averaged molecular weight of 730, and marketed under trademark designation of V-120), NY denotes 6,6-nylon (having a number-averaged molecular weight of 30,000), EC denotes ethyl cellulose (having a number-averaged molecular weight of 30,000 and a degree of acetylation of 30%), and SP denotes polystyrene (having a number-averaged molecular weight of 30,000).

The dye used herein were those identified by the respective (D) Nos. in the list of dyes enumerated in the above examples. The dye E used for preparation of control was a near infrared absorption dye IRA PA-1006 (product of Mitsui-Toatsu Fine Chemical Co., Ltd.) shown previously as quencher Q21 and the dye F used similarly for control was a tricarbocyanine dye having a benzothiazole ring as indicated by the following structural formula.

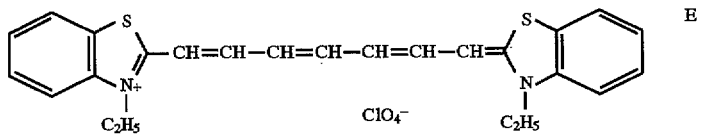

The quenchers additionally used herein were those identified by the respective (Q) Nos. in the list of quenchers enumerated as examples above.

In Table 11, the weight ratios of R/D and the mole ratios of Q/D are also shown.

Each of the media thus prepared was rotated at a rate of 1800 rpm and a recording beam of AlGaAs-GaAs Laser diode (830 nm) was projected to a concentrated spot 1 μm in diameter on the medium in rotation to irradiate the medium at a prescribed frequency in the pattern of a train of pulses.

The medium was irradiated with the writing beam whose pulse width was gradually changed, to determine the particular pulse width at which the quenching ratio of 2.5 was obtained. The reciprocal of this particular pulse width was reported as the writing sensitivity. The results were as shown in Table 11.

In this case, the quenching ratio represented the degree of attenuation, in the pits, of the reflectance of the reading beam on the surface of the medium.

procedure of Example 7. Each of the media now containing written information was heated at 150° C. for 15 seconds with an infrared heater to erase the pits. By this test, it was ascertained that each of the media withstand a plurality of cycles of alternating formation and erasure of pits with satisfactory results.

TABLE 11

| Medium No. | Dye (D) No. | Resin (R) | Singlet Oxygen quencher (Q) No. | R/D (Weight ratio) | Q/D (Mole ratio) | Sensitivity (n sec)$^{-1}$ | S/N ratio (dB) | S/N ratio after degradation of reproduction (dB) | S/N ratio after standing in a dark room (dB) | S/N ratio after irradiation infrared ray (dB) |
|---|---|---|---|---|---|---|---|---|---|---|
| 1* | D1 | NC | — | 1 | 0 | $3 \times 10^{-3}$ | 48 | 25 | 42 | 42 |
| 2 | " | " | Q5 | " | 0.6 | $1 \times 10^{-3}$ | 48 | 45 | 46 | 46 |
| 3 | D2 | " | Q5 | " | 0.6 | $1 \times 10^{-3}$ | 49 | 46 | 48 | 48 |
| 4 | " | " | Q6 | " | 0.5 | $1 \times 10^{-3}$ | 49 | 46 | 48 | 48 |
| 5 | " | " | Q23 | " | 0.4 | $1 \times 10^{-2}$ | 49 | 46 | 47 | 47 |
| 6 | " | " | Q18 | " | 0.3 | $1 \times 10^{-3}$ | 49 | 49 | 49 | 49 |
| 7 | D9 | " | Q19 | " | 0.3 | $8 \times 10^{-3}$ | 47 | 47 | 47 | 47 |
| 8 | " | " | Q20 | " | 0.3 | $8 \times 10^{-3}$ | 47 | 47 | 47 | 47 |
| 9 | D10 | " | Q21 | " | 0.3 | $1 \times 10^{-2}$ | 51 | 50 | 50 | 50 |
| 10 | " | " | Q21 | " | 0.3 | $1 \times 10^{-2}$ | 51 | 50 | 51 | 50 |
| 11* | E | " | — | " | 0 | $8 \times 10^{-4}$ | 36 | 36 | 35 | 35 |
| 12* | " | " | Q5 | " | 0.5 | $8 \times 10^{-4}$ | 36 | 36 | 36 | 35 |
| 13* | F | " | — | " | 0 | $8 \times 10^{-3}$ | 41 | 40 | 25 | — |
| 14* | " | " | Q18 | " | 0.3 | $8 \times 10^{-3}$ | 41 | 40 | 40 | 39 |
| 15* | D1 | NY | Q5 | 1 | 0 | $3 \times 10^{-3}$ | 47 | 25 | 40 | 42 |
| 16 | " | " | " | " | 0.5 | $3 \times 10^{-3}$ | 47 | 43 | 45 | 45 |
| 17* | D2 | PS | Q5 | " | 0 | $2 \times 10^{-3}$ | 48 | 26 | 41 | 41 |
| 18 | " | " | " | " | 0.5 | $2 \times 10^{-3}$ | 48 | 45 | 47 | 47 |
| 19* | D9 | EC | Q6 | " | 0 | $3 \times 10^{-3}$ | 49 | 27 | 35 | 38 |
| 20 | " | " | " | " | 0.5 | $3 \times 10^{-3}$ | 49 | 48 | 49 | 49 |
| 21* | D10 | CI | Q21 | " | 0 | $5 \times 10^{-3}$ | 49 | 31 | 47 | 47 |
| 22 | " | " | " | " | 0.3 | $5 \times 10^{-3}$ | 49 | 48 | 49 | 49 |
| 23* | D1 | — | — | 0 | 0 | $8 \times 10^{-3}$ | 48 | 25 | 42 | 40 |
| 24 | " | — | Q21 | 0 | 0.3 | $8 \times 10^{-3}$ | 48 | 44 | 47 | 48 |
| 25* | D10 | — | — | 0 | 0 | $1 \times 10^{-2}$ | 51 | 28 | 45 | 40 |
| 26 | D10 | — | Q21 | 0 | 0.3 | $2 \times 10^{-2}$ | 51 | 50 | 49 | 50 |

Note) Attached to midium No. shows one for comparison.

Separately, writing of information was carried out with the pulse width fixed at 100 n.sec.

Thereafter, a reading beam of laser diode of 1 mW (830 nm) was projected in the pattern of pulses of 3 KHz having a width of 1 μ.sec, to measure the peak-to-peak S/N ratio on the disc surface in the initial stage and five minutes after start of the projection.

Separately, the medium in which information had been written was kept for 500 hours under the conditions of 40° C. and 90% of relative humidity in a dark room. At the end of this standing, the medium was tested for S/N ratio.

The medium containing the written information was exposed to the light from an infrared lamp of 250 W kept at a distance of 40 cm for five hours. At the end of this exposure, the medium was tested for S/N ratio.

The results were as shown in Table 11.

It is noted from the results given in Table 11 that the media of this invention, Nos. 2–10, 16, 18, 20, 22, 24 and 26 showed conspicuous effects as compared with the media of control, Nos. 1, 11–14, 15, 17, 19, 21, 23 and 25.

EXAMPLE 8

In the media Nos. 16, 18, 20, 22, 24 and 26 of Example 7, writing of information was carried out by following the

EXAMPLE 9

A varying dye (D), a varying resin (R), and a varying singlet oxygen quencher (Q) indicated in Table 12 were dissolved in a proportion correspondingly shown in Table 11 in a prescribed solvent. The resultant solution was spread in a thickness of 0.2 μm on a disc substrate of poly(methyl methacrylate)prepared by casting 15 cm in diameter by following the procedure of Example 7, to afford a medium.

Each of the media thus obtained was subjected to writing of information and then to measurement by following the procedure of Example 7. The results were as shown in Table 12.

EXAMPLE 10

In the media, Nos. 11, 13, 15, 17 and 19 of Example 9, writing of information was carried out by following the procedure of Example 9. They were then heated at 150° C. for 15 seconds with an infrared ray heater to erase the pits. By this test, it was ascertained that all the media could withstand a plurality of cycles of alternating formation and erasure of pits with satisfactory results.

TABLE 12

| Medium No. | Dye (D) No. | Resin (R) | Singlet Oxygen quencher (Q) No. | R/D (Weight ratio) | Q/D (Mole ratio) | S/N ratio (dB) | S/N ratio (dB) after degradation of reproduction | S/N ratio after standing in a dark room (dB) | S/N ratio after irradiation infrarred ray (dB) |
|---|---|---|---|---|---|---|---|---|---|
| 1* | D3 | NC | — | 1 | 0 | 41 | — | 40 | 25 |
| 2 | " | " | Q5 | " | 0.5 | 41 | 39 | 40 | 40 |
| 3 | " | " | Q6 | " | 0.5 | 40 | 39 | 40 | 40 |
| 4 | D4 | " | Q28 | " | 0.6 | 40 | 38 | 40 | 40 |
| 5 | " | " | Q18 | " | 0.3 | 41 | 39 | 41 | 40 |
| 6 | D4 | " | " | " | 0.3 | 41 | 40 | 41 | 41 |
| 7 | " | " | Q21 | " | 0.3 | 41 | 40 | 41 | 40 |
| 8* | A | " | — | " | 0 | 36 | 35 | 36 | 35 |
| 9* | " | " | Q5 | " | 0.5 | 36 | 35 | 36 | 36 |
| 10* | D3 | CI | — | " | 0 | 39 | 30 | 38 | 33 |
| 11 | " | " | Q21 | " | 0.3 | 39 | 38 | 38 | 39 |
| 12* | D14 | NY | — | " | — | 40 | 31 | 39 | 36 |
| 13 | " | " | Q21 | " | 0.3 | 40 | 40 | 40 | 40 |
| 14* | D3 | EC | — | " | 0 | 40 | 32 | 38 | 36 |
| 15 | D3 | EC | Q18 | 1 | 0.3 | 40 | 39 | 40 | 40 |
| 16* | D3 | PS | — | " | 0 | 40 | 31 | 38 | 37 |
| 17 | " | " | Q6 | " | 0.5 | 40 | 40 | 40 | 40 |
| 18* | D17 | — | — | 0 | 0 | 41 | 31 | 41 | 36 |
| 19 | " | — | Q21 | 0 | 0.3 | 41 | 36 | 41 | 40 |

* attached to medium No. shows one for comparison

EXAMPLE 11

The aforementioned dye, D2, D49, D54 and D73, were synthesized by the method described above. The structures of these dye were identified by elementary analysis, NMR, and mass analysis. As the dye, D5, a product of Eastman Kodak Co. was used.

Then, each of the dye, a varying resin (R), and a varying singlet oxygen quencher (Q) indicated in Table 13 below were dissolved in a proportion corresponding indicated in Table 13 in a prescribed solvent. The resultant solution was spread in a thickness of 0.2 μm on a disc substrate of poly(methyl methacrylate) prepared by casting 15 cm in diameter by following the procedure of Example 7, to afford a medium.

The quenchers used herein were those identified by the respective (Q) Nos. in the list of quenchers enumerated as as exampled above.

Table 13 also shows the maximum absorption wavelengths, $(\lambda\ max)_D$ and $(\lambda\ max)_Q$, of the dye and the quenchers and the absorption coefficients, $\epsilon_D$, $\epsilon_Q$ and $\epsilon_D/\epsilon_Q$ of the dye and the quenchers at 830 nm.

The table 13 further shows the weight ratios of R/D and the mole ratios of Q/D.

The media thus prepared were subjected to writing of information and measurement by following the procedure of Example 7. The results were as shown in Table 13.

TABLE 13

| Medium No. | Dye (D) NO. | $(\lambda max)_D$ (nm) | $\epsilon_D$ (cm$^{-1}$) | Resin (R) | Quencher No. | $(\lambda max)_Q$ (nm) | $\epsilon_Q$ (cm$^{-1}$) | R/D (weight ratio) | Q/D (mole) | $[(\lambda max)_D - (\lambda max)_q]$ (nm) | $\epsilon_D/\epsilon_Q$ | C/N ratio (dB) | C/N ratio (dB) after degradation of reproduction | C/N ratio (dB) after irradiation infrared ray |
|---|---|---|---|---|---|---|---|---|---|---|---|---|---|---|
| 1 | D5 | 820 | 1.2 × 10$^5$ | NC | Q7 | 1060 | 1 × 10$^4$ | 0.5 | 0.4 | 240 | 12 | 51 | 51 | 50 |
| 2 | " | " | " | " | Q8 | 1115 | 1 × 10$^4$ | " | " | 295 | 12 | 51 | 51 | 50 |
| 3 | " | " | " | " | Q17 | 1110 | 3 × 10$^4$ | " | " | 290 | 4.0 | 51 | 51 | 51 |
| 4* | " | " | " | " | Q23 | 680 | 8 × 10$^2$ | " | " | −140 | 150 | 51 | 49 | 43 |
| 5* | " | " | " | " | Q24 | 671 | 1 × 10$^2$ | " | " | −149 | 133 | 51 | 50 | 44 |
| 6 | D54 | 820 | 1.2 × 10$^5$ | " | Q17 | 1110 | 3 × 10$^4$ | " | " | 240 | 4.0 | 51 | 51 | 50 |
| 7 | D49 | 820 | 1.1 × 10$^5$ | " | " | " | " | " | " | " | 3.7 | 50 | 50 | 49 |
| 8 | D54 | 820 | 1.1 × 10$^5$ | " | " | " | " | " | " | " | 3.7 | 50 | 50 | 49 |
| 9 | D73 | 780 | 1.4 × 10$^5$ | " | " | " | " | " | " | " | 4.7 | 50 | 50 | 49 |
| 10 | D49 | 820 | 1.1 × 10$^5$ | — | Q8 | 1115 | 1 × 10$^4$ | 0 | " | 295 | 11 | 51 | 49 | 48 |
| 11 | D54 | 820 | 1.1 × 10$^5$ | — | Q17 | 1110 | 3 × 10$^4$ | 0 | " | 240 | 3.7 | 51 | 48 | 48 |
| 12 | D5 | 820 | 1.2 × 10$^5$ | NY | " | 1110 | 3 × 10$^4$ | 0.5 | " | " | 4.0 | 50 | 50 | 49 |
| 13 | " | " | " | CI | " | " | " | " | " | " | " | 50 | 50 | 49 |
| 14 | " | " | " | PS | " | " | " | " | " | " | " | 49 | 49 | 49 |

*CONTROLS

EXAMPLE 12

In the media, No. 12–14, of Example 11, writing of information was carried out by following the procedure of Example 11. The media now containing written information were heated at 150° C. for 15 seconds with an infrared ray heater to erase the pits. By this test, it was ascertained that all the media could withstand a plurality of cycles of alternating formation and erasure of pits with satisfactory results.

EXAMPLE 13

The aforementioned dye, Nos. D5, D49, D54 and D73, were synthesized by the method described above. The structures of the dye were identified by elementary analysis, NMR, and mass analysis. As the dye, D23, a product of Eastman Kodak Co. was used.

Then, each of these coloring matters, a varying resin (R), and a varying singlet oxygen quencher (Q) indicated in Table 14 were dissolved in a proportion corresponding shown in Table 14 in a prescribed solvent. The resultant solution was spread in a thickness of 0.2 μm on a disc substrate of poly(methyl methacrylate) prepared by casting 15 cm in diameter by following the procedure of Example 7, to afford a medium.

The media thus prepared were subjected to writing of information and to measurement by following the procedure of Example 7. The results were as shown in Table 14.

Separately, the media containing written information were kept for 500 hours under the conditions of 40° C. and 90% of relative humidity in a dark room. At the end of this standing, the media were tested for C/N ratio.

Five test pieces each of the media were kept under the same conditions as mentioned above for 500 hours. At the end of the standing, the portions of the test pieces showing sign of crystallization were examined under an optical microscope powered to 400 magnifications. The results of the microscopic observation were rated on the three-point scale, wherein O denotes perfect absence of crystal, Δ denotes presence of less than ten portions showing formation of crystals, and x denotes presence of ten and more portions of crystals.

The media containing written information were exposed to an infrared ray lamp of 250 w at a distance of 40 cm for 30 hours. At the end of this standing, they were tested for C/N ratio.

The results were as shown in Table 15.

EXAMPLE 14

In the media, Nos. 14–16, of Example 13, writing of information was carried out by following the procedure of Example 13. The media now containing the written information were heated at 150° C. for 15 seconds with an infrared ray heater to erase the pits. By this test, it was ascertained that all the media could withstand a plurality of cycles of repeating formation and erasure of pits with satisfactory results.

TABLE 14

| Medium No. | Dye (D) | | | | Quencher (Q) | | | | | | R/D (Weight ratio) | Q/D (Mole ratio) | $Q_2/Q_1$ (mole ratio) |
| | | | | | $Q_1$ | | | $Q_2$ | | | | | |
| | No. | λmax (nm) | $\epsilon_D$ (cm$^{-1}$) | Resin (R) | No. | λmax (nm) | $\epsilon_{Q1}$ (cm$^{-1}$) | No. | λmax (nm) | $\epsilon_{Q2}$ (cm$^{-1}$) | | | |
| 1* | D23 | 780 | $1.3 \times 10^5$ | NC | Q | — | — | — | — | — | 0.5 | — | — |
| 2* | " | " | " | " | Q7 | 1060 | $1 \times 10^4$ | — | — | — | " | 0.4 | — |
| 3* | " | " | " | " | Q8 | 1115 | $1 \times 10^4$ | — | — | — | " | " | — |
| 4* | " | " | " | " | Q17 | 1110 | $3 \times 10^4$ | — | — | — | " | " | — |
| 5 | " | " | " | " | Q7 | 1060 | $1 \times 10^4$ | Q36 | 680 | $8 \times 10^2$ | " | 0.2 | 0.5 |
| 6 | " | " | " | " | Q8 | 1115 | $1 \times 10^4$ | Q37 | 671 | $1 \times 10^2$ | " | " | " |
| 7 | " | " | " | " | Q17 | 1110 | $3 \times 10^4$ | Q7 | 1060 | $1 \times 10^4$ | " | " | " |
| 8 | D5 | 820 | $1.2 \times 10^5$ | " | Q7 | 1060 | $1 \times 10^4$ | Q36 | 680 | $8 \times 10^2$ | " | " | " |
| 9 | D49 | 820 | $1.1 \times 10^5$ | " | Q17 | 1100 | $3 \times 10^4$ | Q8 | 1115 | $1 \times 10^4$ | " | 0.1 | " |
| 10 | D54 | 820 | $1.1 \times 10^5$ | " | " | " | " | Q20 | 680 | $8 \times 10^2$ | " | 0.2 | " |
| 11 | D73 | 780 | $1.4 \times 10^5$ | " | " | " | " | Q8 | 1115 | $1 \times 10^4$ | " | " | " |
| 12 | D49 | 820 | $1.1 \times 10^5$ | — | " | " | " | Q36 | 680 | $8 \times 10^2$ | — | " | " |
| 13 | D54 | 820 | $1.1 \times 10^5$ | — | Q7 | 1060 | $1 \times 10^4$ | Q8 | 1115 | $1 \times 10^4$ | — | 0.1 | " |
| 14 | D23 | 780 | $1.3 \times 10^5$ | NY | Q7 | " | " | " | " | " | 0.5 | 0.2 | " |
| 15 | " | " | " | CI | " | " | " | " | " | " | " | " | " |
| 16 | " | " | " | PS | " | " | " | " | " | " | " | " | " |

*Attached to Medium No. shows one for comparison.

TABLE 15

| Medium NO. | C/N ratio (dB) | Reproduction regradation D/N | C/N ratio after standing in a dark room | Crystallization after standing in a dark room | C/N ratio after irradiation infrared ray |
| --- | --- | --- | --- | --- | --- |
| 1* | 51 | 38 | 48 | x | 32 |
| 2* | 51 | 49 | 49 | Δ | 45 |
| 3* | 51 | 49 | 49 | Δ | 43 |
| 4* | 51 | 49 | 50 | Δ | 45 |
| 5 | 52 | 51 | 50 | o | 50 |
| 6 | 51 | 50 | 50 | o | 50 |
| 7 | 52 | 50 | 51 | o | 50 |
| 8 | 51 | 51 | 50 | o | 51 |
| 9 | 50 | 49 | 50 | o | 49 |
| 10 | 50 | 49 | 50 | o | 49 |
| 11 | 51 | 49 | 50 | o | 49 |
| 12 | 51 | 49 | 50 | o | 50 |

TABLE 15-continued

| Medium NO. | C/N ratio (dB) | Reproduction regradation D/N | C/N ratio after standing in a dark room | Crystallization after standing in a dark room | C/N ratio after irradiation infrared ray |
| --- | --- | --- | --- | --- | --- |
| 13 | 51 | 48 | 50 | o | 50 |
| 14 | 50 | 48 | 50 | o | 50 |
| 15 | 50 | 48 | 50 | o | 50 |
| 16 | 50 | 49 | 50 | o | 50 |

* Attached to Medium No. shows one for comparison.

EXAMPLE 15

Each of the aforementioned dyes, Nos. D2, D49, D54, and D73 (products of Nippon Kankoshikiso Kenkyusho), and the dye, D5 (product of Eastman Kodak Co.) and a varying resin (R) and a varying singlet oxygen quencher both indicated in Table 16 were dissolved in a proportion correspondingly shown in Table 16 in a prescribed solvent. The resultant solution was spread in a thickness of 0.07 μm on a disc substrate of poly(methyl methacrylate) prepared by casting 15 cm in diameter and 1.2 mm in thickness by the procedure of Example 7, to afford medium.

The disc substrate of poly(methyl methacrylate) prepared by casting had 1% by weight of a varying ultraviolet light absorption agent, UV, shown in Table 16 incorporated therein by blending during the molding of the substrate.

The media thus obtained were subjected to writing of information from rear side of the substrate and to measurement by following the procedure of Example 7. The media now containing the written information were exposed for 24 hours each to an infrared ray lamp and a mercury vapor lame and, after the exposure, tested for C/N ratio. The results were as shown in Table 16.

EXAMPLE 16

In the media, Nos. 18–20, of Example 15, writing of information was carried out by following the procedure of Example 15. Then, the media containing the written information were heated at 150° C. for 15 seconds with an infrared ray heater to erase the pits. By this test, it was ascertained that all the media could withstand a plurality of cycles of alternating formation and erasure of pits with satisfactory results.

TABLE 16

| Medium No. | Dye(D) No. | Quencher (Q) No. | Resin (R) | R/D (Weight ratio) | Q/D (Mole ratio) | U V absorber | C/N dB | C/N reproduction regradation (dB) | C/N (dB) after irradiation infrared ray | C/N (dB) after irradiation UV ray |
| --- | --- | --- | --- | --- | --- | --- | --- | --- | --- | --- |
| 1 | D5 | — | NC | 0.5 | — | — | 51 | 42 | 42 | 40 |
| 2 | D5 | Q7 | NC | 0.5 | 0.4 | — | 51 | 51 | 50 | 41 |
| 3 | D5 | — | NC | 0.5 | — | UV2 | 51 | 42 | 43 | 50 |
| 4 | D5 | Q7 | NC | 0.5 | 0.4 | UV2 | 51 | 51 | 50 | 50 |
| 5 | D5 | Q8 | NC | 0.5 | 0.4 | — | 51 | 51 | 50 | 41 |
| 6 | D5 | Q8 | NC | 0.5 | 0.4 | UV5 | 51 | 51 | 50 | 50 |
| 7 | D54 | Q17 | NC | 0.5 | 0.4 | — | 51 | 51 | 50 | 42 |
| 8 | D54 | Q17 | NC | 0.5 | 0.4 | UV5 | 51 | 51 | 50 | 50 |
| 9 | D49 | Q17 | NC | 0.5 | 0.4 | — | 50 | 50 | 49 | 41 |
| 10 | D49 | Q17 | NC | 0.5 | 0.4 | UV2 | 50 | 50 | 50 | 50 |
| 11 | D73 | Q17 | NC | 0.5 | 0.4 | — | 50 | 50 | 49 | 42 |
| 12 | D73 | Q17 | NC | 0.5 | 0.4 | UV2 | 50 | 50 | 50 | 50 |
| 13 | D49 | — | — | — | — | — | 52 | 40 | 41 | 40 |
| 14 | D49 | Q7 | — | — | 0.4 | — | 51 | 51 | 50 | 42 |
| 15 | D49 | Q7 | — | — | 0.4 | UV5 | 51 | 51 | 50 | 51 |
| 16 | D5 | — | NY | 0.5 | — | — | 50 | 40 | 41 | 40 |
| 17 | D5 | Q17 | NY | 0.5 | 0.4 | — | 50 | 49 | 49 | 40 |
| 18 | D5 | Q17 | NY | 0.5 | 0.4 | UV5 | 50 | 49 | 49 | 50 |
| 19 | D5 | Q17 | CI | 0.5 | 0.4 | UV5 | 50 | 49 | 49 | 49 |
| 20 | D5 | Q17 | PS | 0.5 | 0.4 | UV5 | 50 | 49 | 50 | 49 |

EXAMPLE 17

The aforementioned dye, Nos. D5 (product of Eastman Kodak Co.), nitrocellulose, and the singlet oxygen quencher, Q7, were dissolved in a varying proportion indicated in Table 17 in a prescribed solvent. The resultant solution was spread in a thickness of 0.07 μm on a disc substrate of poly(methyl methacrylate) prepared by casting 15 cm in diameter and 1.5 mm in thickness by following the procedure of Example 7, to afford a medium.

The disc substrate of poly(methyl methacrylate) had 1% by weight each of an ultraviolet light absorbing agent, UV2, and a visible light absorbing agent, V4, indicated in Table 17 incorporated therein by blending during the molding of the substrate.

The media thus prepared were subjected to writing of information and to measurement by following the procedure of Example 7. The media now containing the written information were exposed for 24 hours each to an ultraviolet light, a visible light, and an infrared light and, at the end of the exposure, tested for C/N ratio. The results were as shown in Table 18.

The results given in TAble 17 clearly show the effects of the present invention.

These effects of the present invention were exactly reproduced in media prepared by using other dyes, resins, and quenchers. It was further ascertained that when media were prepared by using thermoplastic resins, they could withstand a plurality of cycles of alternating formation and erasure of pits with satisfactory results.

TABLE 17

| Medium No. | Dye | Quencher | Resin | UV Absorber | Visible light Absorber |
|---|---|---|---|---|---|
| 1 | D5 | — | NC | — | — |
| 2 | " | Q7 | " | — | — |
| 3 | " | — | " | UV2 | — |
| 4 | " | Q7 | " | — | V4 |
| 5 | " | Q7 | " | UV2 | — |
| 6 | " | Q7 | " | UV2 | V4 |

TABLE 18

| Medium No. | | C/N ratio (dB) | C/N ratio reproduction regradation (dB) | C/N ratio (dB) after irradiation infrared ray | UV ray | visible light |
|---|---|---|---|---|---|---|
| 1 | | 51 | 42 | 42 | 40 | 48 |
| 2 | | 51 | 51 | 50 | 41 | 48 |
| 3 | Control | 51 | 42 | 43 | 50 | 48 |
| 4 | | 51 | 51 | 51 | 42 | 48 |
| 5 | | 51 | 51 | 51 | 51 | 48 |
| 6 | | 51 | 51 | 51 | 51 | 51 |

EXAMPLE 18

Each of the coloring matters, D244 (product of Nippon Kanko-shikiso Kenkyusho) and D266 (IR140, product of Eastman Kodak Co.) and D230 (DTTC, product of Eastman Kodak Co.), and a varying resin indicated in Table 19 were dissolved in a proportion correspondingly shown in Table 19 in a prescribed solvent. The resultant solution was spread in a thickness of 0.07 μm on a disc substrate of poly(methyl methacrylate)prepared by casting 15 cm in diameter by the procedure of Example 7, to afford a medium.

Each of the media thus prepared was rotated at a rate of 1800 rpm. On the medium thus kept in rotation, a recording beam of AlGaAs-GaAs laser diode (830 nm) was projected in a concentrated spot 1 μm in diameter (output at the concentrated spot 10 mW) to irradiate the medium, from the rear side of the substrate and from the front side of the recording layer, at a fixed frequency in the pattern of a train of pulses of a fixed width of 100 n.sec to write information in the form of pits.

Subsequently, a reading beam of a laser diode of 1 mW (830 nm) was projected in 3 KHz pulses of a width of 1 μ.sec from the rear side of the substrate and from the front side of the recording layer, to measure the peak-to-peak C/N ratio.

Table 19 also indicates the reciprocals of the particular pulse widths of writing beam which have a C/N ratio of more than 40 dB, as relative magnitudes of writing sensitivity.

TABLE 19

| Medium No. | Dye (D) No. | Resin (R) | R/D (weight ratio) | Side of write and reading | C/N ratio (dB) | writing and sensitivity (sec)$^{-1}$ |
|---|---|---|---|---|---|---|
| 1 | D230 | NC | 0.25 | front side | 35 | $1.0 \times 10^7$ |
| 2 | " | " | " | rear side | 45 | $2.0 \times 10^7$ |
| 3 | " | — | 0 | " | 48 | $2.2 \times 10^7$ |
| 4 | D244 | CI | 0.25 | " | 44 | $1.7 \times 10^7$ |
| 5 | " | NY | " | " | 44 | $1.6 \times 10^7$ |
| 6 | " | PS | " | " | 43 | $1.5 \times 10^7$ |
| 7 | D226 | NC | " | " | 50 | $2.5 \times 10^7$ |

EXAMPLE 19

In the media, Nos. 4–7, of Example 18, writing of information was carried out by following the procedure of Example 18. The media now containing the written information were heated at 150° C. for 15 seconds with an infrared ray heater to erase the pits. By this test, it was ascertained that all the media could withstand a plurality of cycles of alternating formation and erasure of pits with satisfactory results.

EXAMPLE 20

A varying dye (D), a varying resin (R), and a varying singlet oxygen quencher (Q) indicated in Table 20 were dissolved in a proportion corresponding indicated in Table 20 in a prescribed solvent. The resultant solution was spread in a thickness of 0.2 μm on a disc substrate of poly(methyl methacrylate) prepared by casting 15 cm in diameter by following the procecure of Example 7.

The media thus prepared were subjected to writing of information and to measurement by following the procedure of Example 7. The results were as shown in Table 20. The dye H used for preparation of control was the dye No. D10, satisfying $R_5=R_5'=CH_3$ in the relevant formula, the dye E used similarly for control was a near infrared absorption dye IRA PA-1006 (product of Mitsui-Toatsu Fine Chemical Co., Ltd.) shown previously as quencher Q21 and the dye F used similarly for control was tricarbocyanine dye having a benzothiazole ring as indicated by the following structural formula.

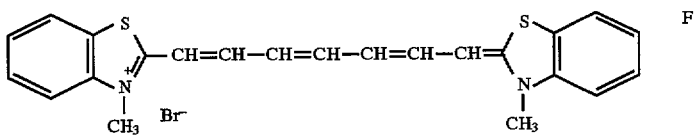

EXAMPLE 21

In the media, Nos. 24–29, of Example 20, writing of information was carried out by following the procedure of Example 20. The media now containing the written information were heated at 150° C. for 15 seconds with an infrared ray heater to erase the pits. By this test, it was ascertained that all the media could withstand a plurality of cycles of alternating formation and erasure of pits with satisfactory results.

example above, a dye, H, for control which was the dye, No. D196 satisfying $R_5=R_5'=C_2H_5$ in the relevant formula, a dye

TABLE 20

| Medium No. | Dye (D) No. | Resin (R) | Singlet oxygen-quencher (Q) No. | R/D (weight ratio) | Q/D (Mole ratio) | Sensitivity (n sec$^{-1}$) | S/N ratio (dB) | Reproduction regradation S/N ratio (dB) | S/N ratio after standing in a dark room (dB) | Crystallization after standing in a dark room | S/N ratio after irradiation infrared ray (dB) |
|---|---|---|---|---|---|---|---|---|---|---|---|
| 1 | D166 | NC | — | 2 | 0 | $1 \times 10^{-3}$ | 50 | 39 | 47 | o | 33 |
| 2 | D170 | " | — | " | " | $2 \times 10^{-3}$ | 49 | 37 | 45 | o | 32 |
| 3 | D174 | " | — | " | " | $3 \times 10^{-3}$ | 51 | 43 | 47 | o | 34 |
| 4 | D175 | " | — | " | " | $2 \times 10^{-3}$ | 51 | 44 | 50 | o | 34 |
| 5 | D186 | " | — | " | " | $3 \times 10^{-3}$ | 49 | 38 | 48 | o | 32 |
| 6 | D188 | " | — | " | " | $1 \times 10^{-3}$ | 50 | 40 | 47 | o | 32 |
| 7 | D166 | " | Q22 | " | 0.33 | $1 \times 10^{-3}$ | 50 | 50 | 47 | o | 49 |
| 8 | " | " | Q33 | " | " | $2 \times 10^{-3}$ | 49 | 49 | 45 | o | 49 |
| 9 | " | " | Q21 | " | " | $3 \times 10^{-3}$ | 51 | 51 | 47 | o | 50 |
| 10 | D175 | " | Q22 | " | " | $2 \times 10^{-3}$ | 51 | 51 | 50 | o | 51 |
| 11 | " | " | Q33 | " | " | $3 \times 10^{-3}$ | 49 | 49 | 48 | o | 49 |
| 12 | " | " | Q21 | " | " | $1 \times 10^{-3}$ | 50 | 50 | 47 | o | 49 |
| 13* | G | " | — | 5 | 0 | $2 \times 10^{-3}$ | 53 | 44 | 49 | Δ | 47 |
| 14* | " | " | Q21 | " | 0.33 | $2 \times 10^{-3}$ | 53 | 47 | 49 | Δ | 49 |
| 15* | E | " | — | 2 | 0 | $2 \times 10^{-3}$ | 40 | 32 | 34 | x | 32 |
| 16* | " | " | Q33 | " | 0.33 | $2 \times 10^{-3}$ | 40 | 39 | 35 | x | 38 |
| 17* | F | " | — | " | 0 | $2 \times 10^{-3}$ | 33 | 32 | 33 | Δ | 32 |
| 18* | F | NC | Q33 | 2 | 0.33 | $2 \times 10^{-3}$ | 37 | 35 | 36 | Δ | 37 |
| 19 | D166 | — | — | — | 0 | $2 \times 10^{-3}$ | 50 | 42 | 42 | o | 33 |
| 20 | D169 | — | — | — | " | $2 \times 10^{-3}$ | 51 | 41 | 49 | o | 33 |
| 21 | D176 | — | — | — | " | $3 \times 10^{-3}$ | 50 | 41 | 48 | o | 42 |
| 22 | D126 | — | Q21 | — | 0.33 | $2 \times 10^{-3}$ | 50 | 50 | 49 | o | 43 |
| 23 | D129 | — | " | — | " | $2 \times 10^{-3}$ | 50 | 49 | 49 | o | 42 |
| 24 | D166 | NY | — | — | 0 | $2 \times 10^{-3}$ | 49 | 37 | 46 | o | 32 |
| 25 | " | " | Q21 | 2 | 0.33 | $2 \times 10^{-3}$ | 49 | 48 | 47 | o | 48 |
| 26 | " | C | — | " | 0 | $2 \times 10^{-3}$ | 48 | 34 | 45 | o | 32 |
| 27 | " | " | Q21 | " | 0.33 | $3 \times 10^{-3}$ | 48 | 46 | 47 | o | 47 |
| 28 | " | PS | — | " | 0 | $2 \times 10^{-3}$ | 50 | 40 | 47 | o | 33 |
| 29 | " | " | Q21 | " | 0.33 | $2 \times 10^{-3}$ | 50 | 48 | 47 | o | 47 |

Note)
*Attached to Medium NO. shows one for comparison.

EXAMPLE 22

The aforementioned dye, Nos. D195, D196, D197, D198 D201, D202 and D207, were synthesized by the method described above. The structures of these media were identified by elementary analysis, NMR, and mass analysis.

Then, each of these dyes, a varying resin (R), and a varying singlet oxygen quencher (Q) both indicated in Table 21 were dissolved in a proportion correspondingly indicated Table 21 were dissolved in a proportion correspondingly indicated in Table 21 in a prescribed solvent. The resultant solution was spread in a thickness of 0.2 μm on a disc substrate of poly(methyl methacrylate) 15 cm in diameter by following the procedure of Example 7, to afford a medium.

Separately, media were prepared by using dyes identified by the same No's as used in the list of dyes enumerated as example above, a dye, H, for control which was the dye, No. D196 satisfying $R_5=R_5'=C_2H_5$ in the relevant formula, a dye I, for control which was the dye, No. D4, satisfying $R_5=R_5'=C_2H_5$ in the relevant formula, and a dye E, for control which was the near infrared ray absorbing dye IRA PA-1006 (product of Mitsui-Toastu Fine Chemical Co., Ltd.) indicated as quencher Q21.

The various media prepared as described above were subjected to writing of information and to measurement by following the procedure of Example 7. The results were as shown in Table 21.

Under the same conditions as described above, five test pieces each of the media were kept for 500 hours.

TABLE 21

| Medium No. | Dye (D) No. | Resin (R) | Singlet oxygen-quencher (Q) No. | R/D (Weight ratio) | Q/D (Mole ratio) | C/N ratio (dB) | Reproduction regradation C/N ratio (dB) | C/N ratio after standing in a dark room (dB) | Crystallization after standing in a dark room | C/N ratio after irradiation infrared ray (dB) |
|---|---|---|---|---|---|---|---|---|---|---|
| 1 | D196 | NC | — | 0.5 | 0 | 51 | 38 | 48 | o | 32 |
| 2 | D197 | " | — | " | " | 50 | 39 | 49 | o | 33 |
| 3 | D198 | " | — | " | " | 48 | 36 | 47 | o | 31 |
| 4 | D201 | " | — | " | " | 51 | 38 | 49 | o | 33 |
| 5 | D202 | " | — | " | " | 48 | 35 | 49 | o | 32 |
| 6 | D207 | " | — | " | " | 50 | 36 | 49 | o | 31 |
| 7 | D196 | " | Q5 | " | 0.6 | 50 | 49 | 49 | o | 48 |
| 8 | " | " | Q6 | " | 0.4 | 50 | 49 | 49 | o | 48 |

TABLE 21-continued

| Medium No. | Dye (D) No. | Resin (R) | Singlet oxygen-quencher (Q) No. | R/D (Weight ratio) | Q/D (Mole ratio) | C/N ratio (dB) | Reproduction regradation C/N ratio (dB) | C/N ratio after standing in a dark room (dB) | Crystallization after standing in a dark room | C/N ratio after irradiation infrared ray (dB) |
|---|---|---|---|---|---|---|---|---|---|---|
| 9 | " | " | Q18 | " | 0.2 | 51 | 51 | 50 | o | 49 |
| 10 | " | " | Q21 | " | " | 51 | 51 | 51 | o | 50 |
| 11 | " | " | Q28 | " | 0.3 | 51 | 50 | 51 | o | 50 |
| 12 | " | " | Q32 | " | " | 51 | 51 | 50 | o | 50 |
| 13* | H | " | — | 5 | 0 | 42 | 34 | 41 | Δ | 33 |
| 14* | " | " | Q21 | " | 0.2 | 42 | 42 | 41 | Δ | 41 |
| 15* | I | NC | — | 0.5 | 0 | 42 | 33 | 41 | Δ | 32 |
| 16* | " | " | Q21 | " | 0.33 | 42 | 41 | 41 | Δ | 41 |
| 17* | E | " | — | " | 0 | 33 | 32 | 33 | x | 32 |
| 18* | " | " | Q33 | " | 0.33 | 37 | 35 | 36 | x | 37 |
| 19 | D195 | — | — | 0 | 0 | 49 | 35 | 48 | o | 32 |
| 20 | " | — | Q5 | " | 0.2 | 48 | 48 | 47 | o | 48 |
| 21 | D198 | — | — | " | 0 | 48 | 36 | 47 | o | 35 |
| 22 | D198 | — | Q21 | " | 0.2 | 48 | 48 | 47 | o | 47 |
| 23 | D196 | NY | — | 1 | 0 | 51 | 40 | 50 | o | 35 |
| 24 | " | " | Q5 | " | 0.6 | 50 | 50 | 49 | o | 49 |
| 25 | " | CI | — | " | 0 | 50 | 37 | 49 | o | 36 |
| 26 | " | " | Q21 | " | 0.2 | 50 | 50 | 49 | o | 49 |
| 27 | " | PS | — | " | 0 | 50 | 37 | 49 | o | 35 |
| 28 | " | " | Q21 | " | 0.2 | 50 | 50 | 49 | o | 49 |

Note)
*Attached Medium No. shows one for comparison.

The portions of these test pieces showing sign of crystallization were observed under an optical microscope powered to 400 magnifications. The results of the microscopic observation were rated by the three-point scale, wherein O denotes perfect absence of crystal, Δ denotes presence of less than 10 spots of crystallization, and x denotes presence of not less than 10 spots of crystallization.

EXAMPLE 23

In the media of Example 22, writing of information was carried out by following the procedure of Example 22. The media now containing the written information were heated at 150° C. for 15 seconds by an infrared ray heater. By this test, it was ascertained that all the medial could withstand a plurality of cycles of alternating formation and erasure of pits with satisfactory results.

EXAMPLE 24

A varying dye (D), a varying resin (R), and a varying quencher (Q) indicated in Table 22 were dissolved in a proportion correspondingly indicated in Table 22 in a prescribed solvent. The resultant solution was spread as a recording layer in a thickness of 0.07 μm on a disc substrate of disc grade polymethyl methacrylate (having melt flow index of 16) 15 cm in diameter, to afford a medium.

In this case, all the media conforming to the present invention had an underlying layer interposed between the recording layer and the substrate.

The underlying layer was formed by applying to the substrate a 2% methylethyl ketone solution of tetraethyl acetacetate Zr (synthetized by causing 1 mole of Zr oxychloride and 4 moles of ethyl acetacetate to react in the presence of sodium carbonate).

The thickness of the underlying layer was about 0.08 μm and the composition of the solution used to form this layer was substantially $ZrO_2 \cdot 2H_2O$.

The various media prepared as described above were subjected to writing of information and to measurement by following the procedure of Example 7. The results were as shown in Table 22.

EXAMPLE 25

In the media, Nos. 8–10, of Example 24, writing of information was carried out by following the procedure of Example 24. The media now containing the written information were heated at 150° C. for 15 seconds by an infrared ray heater. By this test, it was ascertained that all the media could withstand a plurality of cycles of alternating formation and erasure of pits with satisfactory results.

EXAMPLE 26

A varying dye (D), a varying resin (R), and a varying quencher (Q) indicated in Table 23 below were dissolved in a proportion correspondingly indicated in Table 23 in a prescribed solvent. The resultant solution was spread as a recording layer in a thickness of 0.07 μm on a disc substrate of polymethyl methacrylate (having an average polymerization degree of 1500) 15 cm in diameter, to afford a medium.

In this case, all the media conforming to this invention had an underlying layer interposed between the recording layer and the substrate.

This underlying layer was formed by applying to the substrate the aforementioned T14 diluted with i-propanol-water (1:1) mixture to 30 times the original volume.

The thickness of the underlying layer was about 0.03 μm and the composition of the solution used to form this layer was substantially $TiO_2$.

Each of the media thus prepared was rotated at a rate of 1800 rpm. To the medium thus kept in rotation, a recording beam of AlGaAs-GaAs laser diode (830 nm) was projected into a concentrated spot (output at the concentrated spot 10 mW) 1 μm in diameter to irradiate the medium through the substrate with pulses of a width of 100 n.sec at a prescribed frequency in the pattern of a train of pulses, to effect writing of information.

Subsequently, a reading beam of a 1 mW laser diode (830 nm) was projected in the form of 3 KHz pulses of a width of 1 μ.sec on the medium from the rear side of the substrate, to measure the peak-to-peak C/N ratio on the front side of the disc. The results were as shown in Table 23.

EXAMPLE 27

In the media, Nos. 8–10, of Example 26, writing of information was carried out by following the procedure of Example 1. The media now containing the written information were heated at 150° C. for 15 seconds by an infrared ray heater to erase the pits. By this test, it was ascertained that all the media could withstand a plurality of cycles of alternating formation and erasure of pits with satisfactory results.

TABLE 22

| Midium No. | Dye (D) No. | Quencher (Q) No. | Resin (R) | R/D (Weight ratio) | Q/D (Weight ratio) | Under layer of titanium oxide | C/N Ratio (dB) |
|---|---|---|---|---|---|---|---|
| 1 | D2 | — | NC | 2/3 | — | — | 28 |
| 2 | " | Q21 | " | 1/4 | 4/15 | — | 28 |
| 3 | " | — | " | 2/3 | — | yes | 51 |
| 4 | " | Q21 | " | 1/4 | 4/15 | yes | 51 |
| 5 | D31 | — | — | — | — | — | 29 |
| 6 | " | — | — | — | — | yes | 52 |
| 7 | D10 | Q21 | NY | 1/4 | 4/15 | — | 27 |
| 8 | " | " | NY | " | 4/15 | yes | 50 |
| 9 | " | " | CI | " | " | yes | 50 |
| 10 | " | " | PS | " | " | yes | 50 |

TABLE 23

| Midium No. | Dye (D) No. | Quencher (Q) No. | Resin (R) | R/D (weight ratio) | Q/D (weight ratio) | Under rear of titanium oxide | C/N Ratio (dB) |
|---|---|---|---|---|---|---|---|
| 1 | D10 | — | NC | 2/3 | — | — | 28 |
| 2 | " | Q21 | " | 1/4 | 4/15 | — | 28 |
| 3 | " | — | " | 2/3 | — | yes | 51 |
| 4 | " | Q21 | " | 1/4 | 4/15 | yes | 51 |
| 5 | D31 | — | — | — | — | — | 29 |
| 6 | " | — | — | — | — | yes | 52 |
| 7 | D2 | Q21 | NY | 1/4 | 4/15 | — | 27 |
| 8 | " | " | NY | " | " | yes | 50 |
| 9 | " | " | CI | " | " | yes | 50 |
| 10 | " | " | PS | " | " | yes | 50 |

What is claimed is:

1. An optical recording medium of the heat mode type comprising a substrate having deposited thereon a resin free recording layer and comprising at least one laser light absorbing dye mixed with at least one quencher, and having a thickness in the range of from 0.03 to 2 um, said dye being represented by the formula I:

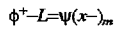  (I)

wherein φ and ψ independently of each other denote an indole ring, thiazole ring, an oxazole ring; a selenazole ring, an imidazole ring or a pyridine ring which may have at least one aromatic ring condensed thereto, L denotes a methine chain for formation of a mono-, di-, tri- or tetra-cyanine dye, X- denotes an anion, and m denotes 0 or 1.

2. An optical recording medium according to claim 1, wherein said quencher is incorporated in an amount of from 0.05 to 12 moles per mole of said dye.

3. An optical recording medium according to claim 1, wherein said quencher is a transition metal chelate compound.

4. An optical recording medium according to claim 1, wherein L is selected from the class consisting of the groups represented by the following formulae:

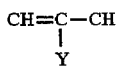 (XXI)

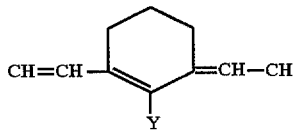 (XXII)

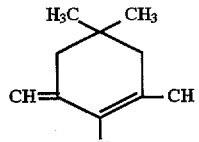 (XXIII)

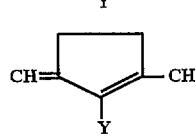 (XXIV)

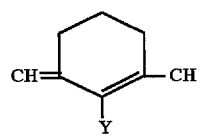 (XXV)

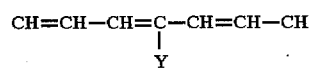 (XXVI)

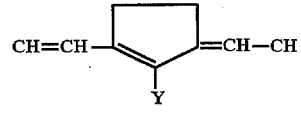 (XXVII)

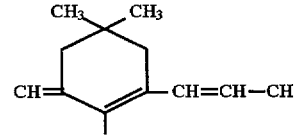 (XXVIII)

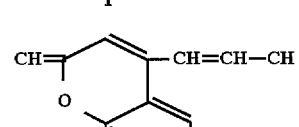 (XXIV)

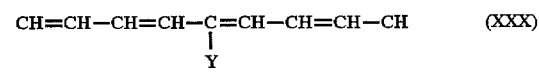 (XXX)

wherein Y is selected from the group consisting of hydrogen, lower alkyl, lower alkoxy, cycloalkyl, dimethyl amino, diphenyl amino, methylphenyl amino, morpholino, imidazolidine, ethoxycarbonyl, piperazine, alkylcarbonyloxy, methylthio, halogen atoms, cyano and nitro.

5. An optical recording medium according to claim 1 wherein φ and ψ each denote a group represented by the formulae:

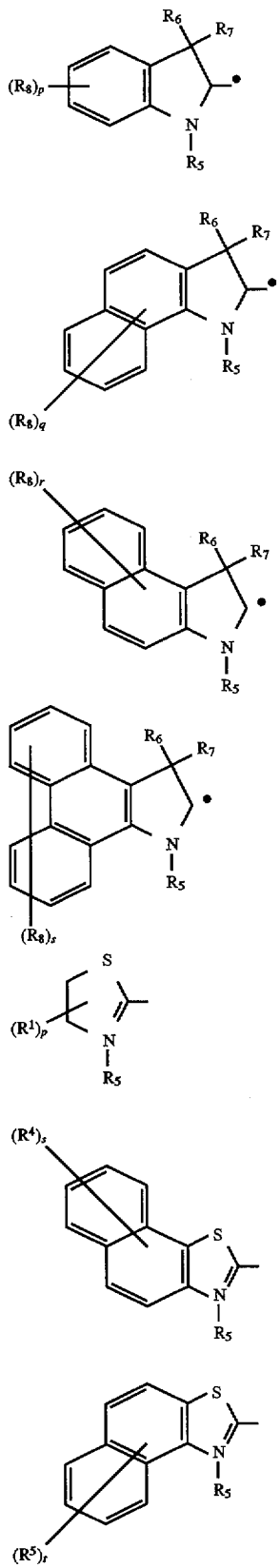
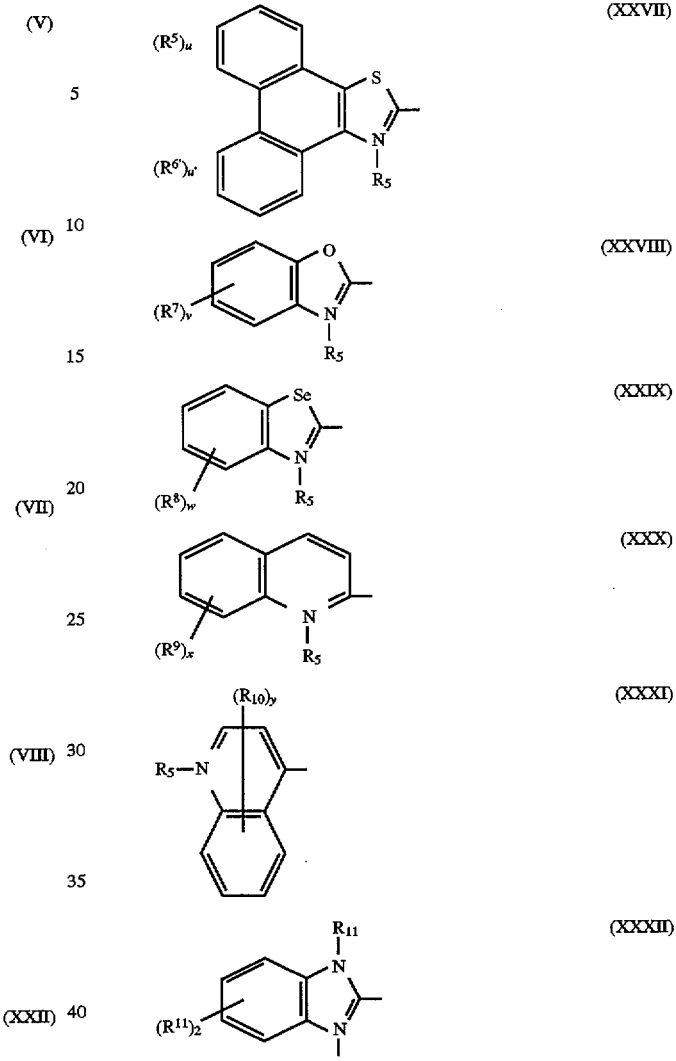

wherein $R_5$ and $R_{11}$ each denote a substituted or unsubstituted alkyl or aryl group; $R_6$ and $R_7$ each denote an alkyl or aryl group; $R_8$ denotes an alkyl, aryl, heterocyclic, hydrogen, halogen, alkylthio, alkylhydroxycarbonyl, or carboxylic group or halogen, p, q, r, and s when associated with $R_8$ may be the same or different and denote an integer of 0 to 4; $R^1$, $R^4$, $R^5$, $R^6$, $R^{6'}$, $R^7$, $R^8$, $R^9$ and $R^{10}$ which may be the same or different denote alkyl, aryl, heterocyclic, halogen, alkoxy, alkylthio, alkylhydroxycarbonyl, or carboxylic; and p, s, t, u, u', v, w, x, y and z each denote the integer 0 or at least 1.

6. An optical recording medium according to claim 1 wherein the recording layer contains from about 0.05 to about 1.2 moles of at least one added quencher per mole of dye.

7. An optical recording medium according to claim 1 wherein the anion is selected from the group consisting of iodide, bromide, perchlorate, boron tetrafluoride, p-chlorobenzene sulfonate and p-methylbenzene sulfonate.

\* \* \* \* \*